(12) United States Patent
Buhr

(10) Patent No.: US 8,882,588 B2
(45) Date of Patent: Nov. 11, 2014

(54) METHOD AND APPARATUS FOR USE IN RESERVING A POSITION WITHIN A SIMULATION FOR ANOTHER USER

(75) Inventor: Brian Douglas Buhr, San Diego, CA (US)

(73) Assignee: Sony Computer Entertainment America LLC, San Mateo, CA (US)

(*) Notice: Subject to any disclaimer, the term of this patent is extended or adjusted under 35 U.S.C. 154(b) by 0 days.

(21) Appl. No.: 13/426,456

(22) Filed: Mar. 21, 2012

(65) Prior Publication Data

US 2013/0252725 A1    Sep. 26, 2013

(51) Int. Cl.
A63F 9/00    (2006.01)

(52) U.S. Cl.
USPC .......................................................... 463/29

(58) Field of Classification Search
None
See application file for complete search history.

(56) References Cited

U.S. PATENT DOCUMENTS

| | | | |
|---|---|---|---|
| 7,351,138 B2 | 4/2008 | Busse et al. | |
| 7,354,345 B2* | 4/2008 | Bortnik et al. | 463/42 |
| 7,559,834 B1* | 7/2009 | York | 463/2 |
| 8,423,063 B2* | 4/2013 | Premutico | 455/500 |
| 8,439,733 B2 | 5/2013 | Kay et al. | |
| 2002/0094871 A1 | 7/2002 | Luciano, Jr. et al. | |
| 2003/0073494 A1* | 4/2003 | Kalpakian et al. | 463/42 |
| 2005/0043097 A1* | 2/2005 | March et al. | 463/42 |
| 2005/0278041 A1* | 12/2005 | Bortnik et al. | 700/91 |
| 2006/0154710 A1* | 7/2006 | Serafat | 463/1 |
| 2007/0005693 A1 | 1/2007 | Sampath et al. | |
| 2007/0077991 A1* | 4/2007 | Horigome | 463/40 |
| 2007/0087799 A1* | 4/2007 | Van Luchene | 463/1 |
| 2008/0207332 A1 | 8/2008 | Bortnik et al. | |
| 2008/0227534 A1 | 9/2008 | Kelly et al. | |
| 2008/0274802 A1* | 11/2008 | Joao | 463/25 |
| 2008/0318655 A1 | 12/2008 | Davies | |
| 2009/0125637 A1 | 5/2009 | Matuszewski | |
| 2009/0181775 A1 | 7/2009 | Nilsson et al. | |
| 2010/0227691 A1 | 9/2010 | Karsten | |

(Continued)

FOREIGN PATENT DOCUMENTS

WO    2012/145231 A1    10/2012
WO    2013/142063 A1    9/2013

OTHER PUBLICATIONS

Buhr; U.S. Appl. No. 13/188,631 entitled "Method and Apparatus for use in Preserving a Game State"; filed Jul. 22, 2011; 57 Pages.

(Continued)

*Primary Examiner* — Seng H Lim
(74) *Attorney, Agent, or Firm* — Fitch, Even, Tabin & Flannery LLP

(57) ABSTRACT

The present embodiments provide systems, apparatuses, processes and methods of providing interactive electronic gaming. Some of these methods comprise: receiving, during an active interactive electronic game with which a plurality of remote users are participating over a distributed network, a notification of termination of a first user's participation in the active interactive game; identifying a first position within the interactive game corresponding with the first user of the plurality of remote users; determining whether to provide a game state transfer of the first position within the interactive game; identifying, in response to determining to provide the game state transfer, a second user to which the first position is to be transferred, where the second user is not an active participant in the interactive game; and reserving, in response to determining to provide the game state transfer, the first position for the identified second user.

17 Claims, 12 Drawing Sheets

(56) References Cited

U.S. PATENT DOCUMENTS

| | | | | |
|---|---|---|---|---|
| 2010/0311483 | A1* | 12/2010 | Fields et al. | 463/2 |
| 2010/0311506 | A1* | 12/2010 | Bai | 463/42 |
| 2011/0066720 | A1 | 3/2011 | Wang et al. | |
| 2011/0172018 | A1* | 7/2011 | Premutico | 463/42 |
| 2011/0237332 | A1 | 9/2011 | Abiko | |
| 2012/0270644 | A1* | 10/2012 | Buhr | 463/29 |
| 2013/0344966 | A1* | 12/2013 | Mustafa | 463/42 |

OTHER PUBLICATIONS

USPTO; Non-Final Office Action issued in U.S. Appl. No. 13/188,631; Mailed Jul. 11, 2012; 25 Pages.

USPTO; Final Office Action issued in U.S. Appl. No. 13/188,631; Mailed Dec. 26, 2012; 19 pages.

Patent Cooperation Treaty; "Notification of Transmittal of the International Search Report and the Written Opinion of the International Searching Authority, or the Declaration"; Issued in Corresponding Foreign Application No. PCT/US12/33375; Mailed Jul. 5, 2012; 1 page.

Patent Cooperation Treaty; "International Search Report" Issued in Corresponding Foreign Application No. PCT/US12/33375; Mailed Jul. 5, 2012; 3 pages.

Patent Cooperation Treaty; Written Opinion of the International Searching Authority; Issued in Corresponding Foreign Application No. PCT/US12/33375; Mailed Jul. 5, 2012; 5 pages.

Patent Cooperation Treaty; "Notification of Transmittal of the International Search Report and the Written Opinion of the International Searching Authority, or the Declaration"; Issued in Corresponding Foreign Application No. PCT/US13/29372; Mailed Mar. 29, 2013; 1 page.

Patent Cooperation Treaty; "International Search Report" Issued in Corresponding Foreign Application No. PCT/US13/29372; Mailed Mar. 29, 2013; 2 pages.

Patent Cooperation Treaty; "Written Opinion of the International Searching Authority" Issued in Corresponding Foreign Application No. PCT/US13/29372; Mailed Mar. 29, 2013; 8 pages.

USPTO; Non-Final Office Action issued in U.S. Appl. No. 13/188,631; Mailed Sep. 10, 2013; 22 Pages.

USPTO; Notice of Allowance & Examiner-Initiated Interview Summary issued in U.S. Appl. No. 13/188,631, mailed Feb. 28, 2014, 15 pages.

USPTO; Applicant-Initiated Interview Summary issued in U.S. Appl. No. 13/188,631; Mailed Dec. 18, 2013; 6 Pages.

USPTO; Notice of Allowance issued in U.S. Appl. No. 13/188,631; Mailed Jun. 16, 2014; 7 pages.

\* cited by examiner

METHOD AND APPARATUS FOR USE IN RESERVING A POSITION WITHIN A SIMULATION FOR ANOTHER USER

BACKGROUND

1. Field of the Invention

The present invention relates generally to computer simulations, and more specifically to user interaction with simulations.

2. Discussion of Related Art

Many simulation systems, such as computers, gaming systems and/or entertainment systems, allow users to interact with simulations, such as interactive gaming simulations. Similarly, some systems allow multiple users to participate in interactive game simulations. Typically, the multiple users communicate with one or more other simulation systems to provide at least some control over the playback of the game simulation. For example, in some instances users utilize one or more input devices, such as a keyboard, mouse, joystick, a hand-held controller, game controller, or other controller. A user or player uses the controller to send commands or other instructions that can affect control and/or playback of the simulation. For example, the controller may be provided with one or ore manipulators which are operated by a user, such as a joy stick, one or buttons, roller ball, scroll wheel, and/or other such manipulators, such that signals corresponding to the manipulation of the one or more manipulators are sent to a local simulation system and/or other remote simulation systems.

It is with respect to these and other background information factors that the present invention has evolved.

SUMMARY OF THE INVENTION

Several embodiments of the invention advantageously address the needs above as well as other needs with methods of providing interactive electronic gaming. Some of these methods comprise: receiving, during an active interactive electronic game with which a plurality of remote users are participating over a distributed network, a notification of termination of a first user's participation in the active interactive game; identifying a first position within the interactive game corresponding with the first user of the plurality of remote users; determining, during the active interactive game, whether to provide a game state transfer of the first position within the interactive game; identifying, in response to determining to provide the game state transfer, a second user to which the first position is to be transferred, where the second user is not an active participant in the interactive game; and reserving, in response to determining to provide the game state transfer, the first position for the identified second user.

Other embodiments provide computer program products comprising a computer-readable storage medium for embodying a computer program for input to a processor based system and a computer program embodied in the medium for causing the processor based system to perform steps comprising: receiving, during an active interactive electronic game with which a plurality of remote users are participating over a distributed network, a notification of termination of a first user's participation in the active interactive game; identifying a first position within the interactive game corresponding with the first user of the plurality of remote users; determining, during the active interactive game, whether to provide a game state transfer of the first position within the interactive game; identifying, in response to determining to provide the game state transfer, a second user to which the first position is to be transferred, where the second user is not an active participant in the interactive game; and reserving, in response to determining to provide the game state transfer, the first position for the identified second user.

Some embodiments provide systems configured to reserve a position within an interactive game. At least some of these systems comprise: means for receiving, during an active interactive electronic game with which a plurality of remote users are participating over a distributed network, a notification of termination of a first user's participation in the active interactive game; means for identifying a first position within the interactive game corresponding with the first user of the plurality of remote users; means for determining, during the active interactive game, whether to provide a game state transfer of the first position within the interactive game; means for identifying, in response to determining to provide the game state transfer, a second user to which the first position is to be transferred, where the second user is not an active participant in the interactive game; and means for reserving, in response to determining to provide the game state transfer, the first position for the identified second user.

BRIEF DESCRIPTION OF THE DRAWINGS

The above and other aspects, features and advantages of several embodiments of the present invention will be more apparent from the following more particular description thereof, presented in conjunction with the following drawings.

Figure 1:
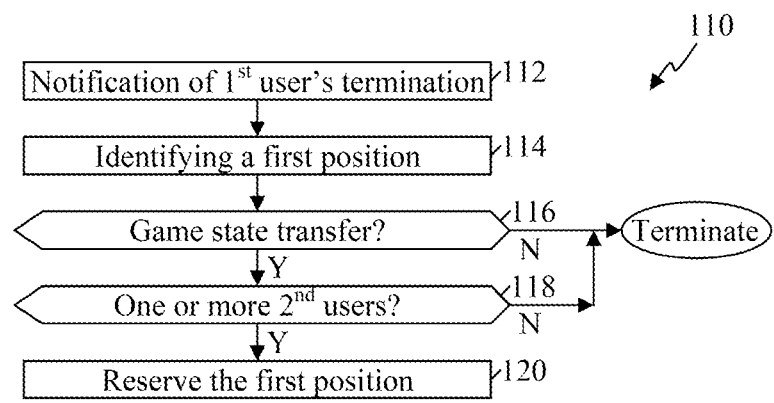
FIG. 1 illustrates a simplified flow diagram of a process of providing a simulation or game state transfer from a first user to a second user.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," "some embodiments," "an implementation," "some implementations," or similar language means that a particular feature, structure, or characteristic described in connection with the embodiment is included in at least one embodiment of the present invention. Thus, appearances of the phrases "in one embodiment," "in an embodiment," "in some embodiments," "in some implementations," "in some instances" and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Many multi-user computer simulations allow users to connect with and participate in a simulation via a distributed network, such as the Internet, a local area network or other such distributed networks. In these simulations and/or games users may join the game as individuals, or often as a participant of a team. While participating a user typically accumulates points, and in some instances additional features or functionality, while advancing through the game. Similarly, a user's participation in a team can similarly provide the team with additional skills and/or functionality. As such, it is often beneficial to maintain a user within a game, and in some instances to maintain a virtual character within the simulation and associated with the user. Losing a user or a user deciding to leave a simulation can have adverse effects on the other participants in the simulation. For example, a team within a simulation loses a potentially valuable asset to the team, potentially loses the capabilities provided by the virtual character, and the like. Additionally, a user leaving a simulation may result in another user joining the game in place of the user that departed from the game, and in many instances the new user may not be known by other members of a team from which the first user departed and/or may not have the skill set the remaining members of a team want.

The present embodiments provide methods, systems and processes of reserving a position within a simulation associated with a user that is lost or has decided to depart for another user. Additionally, in some instances, the departing user can reserve her or his position for another specific user to take over the position. The ability to reserve a user's position within a simulation for another user provides some control over who can join an active simulation and/or who can join a particular team within an active simulation. In some embodiments, other participants in the active game that a user is leaving or has departed from may reserve the vacant position within the simulation for another user, and/or may have some control over whether a departing user can reserve her/his position and/or for whom that departing user can reserve the position.

For example, a group of friends may be participating in a simulation as members of a team. Should one of those friends need to leave the simulation, the departing user and/or the other friends may reserve the departing user's position within the simulation and designate or authorize another user to join the simulation in the reserved position. In some instances, a virtual character, avatar or the like within the virtual simulation environment may also be reserved so that the newly joined user can simply continue playback with the virtual character that was already established within the simulation along with the capabilities, scores, features, and the like that may have been accumulated by the departed user.

Similarly, a participant's device connected over the distributed network may experience difficulties in maintaining a connection over the distributed network or in maintaining a sufficiently effective connection to continue participation in the simulation. It is a common problem for participants of a simulation, such as an interactive electronic game, to lose connection or experience insufficient connectivity or bandwidth with a device hosting or managing the simulation, such as a game server, or experience other difficulties with their system and/or the communication with other devices hosting the game simulation. The loss of connection, insufficient connectivity and/or other such problems that can prevent a user from participating in and/or effectively participating in the simulation can result from any number of things or combinations of things, such as a device problem or failure (e.g., a game client crash), internet connection loss, temporary decrease in network connection bandwidth causing server disconnect, short power cycle and/or outage, or other reasons.

Additionally, it is common for a user to intentionally disconnect from a simulation server and terminate participation in a simulation. For example, time availability, parental restrictions, appointments, other commitments, time of day and/or other such factors may prevent a user from continuing to participate. As such, a user may intentionally disconnect from and terminate participation in a simulation.

Often, as a result of a loss of connection, whether inadvertent or intentional, a participant in a simulation (e.g., a game player) loses her/his place or position at the hosting device or simulation server and within the simulation, and in many instances loses points, credits, status, position and/or other simulation parameters that may have been acquired while participating in the simulation. As a specific example, often when a user disconnects or connectivity is lost between an electronic game server hosting an interactive electronic game and a user's game console, the player participating through the game console loses her place in the game server, and typically loses her association or position with teammates or friends also participating in the simulation. The user also may lose her status, position, points, levels and other such statistics or parameters; be forced to accept a "loss" or "quit" result; and/or may be unable to rejoin the game or same team within the game because the game or team has become full with other participants (e.g., an alternate user joins the game as a result of the open position within the game as a result of the first user's lost connection). Further, the lost connection or intentional termination may also adversely affect other participants in the simulation, such as those other participants on a team with the lost user.

Additionally, it can be common for friends, a group of friends, clan mates or the like to want to cooperatively participate together in a simulation. The intended simulation, however, may not have sufficient player slots for all the friends to join and participate concurrently. Often when this happens a first friend actively participating in the simulation has to quit the simulation and hope that a second friend can join the simulation before another unknown or undesirable user takes over and fills the position or slot made available by the first friend's departure from the simulation. Even if the second friend can join in the game or the first friend can rejoin the game, the first friend often still loses some if not all of the game parameters previously obtained during playback, such as status, position, points, characteristics, rewards, levels, powers and the like. Further, the second friend (or first friend if rejoined) does not continue with the progress made by the first friend. Instead, the second friend joins as a new participant and typically starts from a base level within the simulation.

In some instances, a first team or clan in a simulation may have a larger number of members than a second team or clan competing with the first team in the simulation. As a result, often the first clan sacrifices by disallowing its full clan membership from participating in the match in order to allow fair play. It might be discovered during the simulation that a clan member who is actively participating in the simulation is not having a successful game, and it would be better for another clan member to take their place in the match. Alternatively, a clan member may unintentionally quit or be dropped from the game, or may have to intentionally depart from the game. When these events occurred in prior simulation systems it was generally not possible for a lost first clan member to designate or "tag" a second member of the clan ("tag" out in the style of wrestling) or to allow another clan member to take the first clan member's position or spot, while preserving the progress made so far by the first clan member. Similarly, there is no managed order for which clan member should be joined next to the simulation. As such, any and all clan mates may attempt to join and it is generally random luck as to which of the clan members is faster or is selected to replace the player who left. In other instances, which may be worse, the clan that lost a member may be slow to getting a replacement clan member into the open slot and as a result loses opportunity to advance, score points, win, and/or may be adversely affected.

The present embodiments provide methods and systems to retain a participant's position within a simulation as a result of an intended termination, a failure, a disconnect, a degraded connection or other such factors that might otherwise result in the participant being dropped from a simulation, and retaining that position for an alternate participant. In general, some embodiments detect an intention of a first participant to terminate participation in a simulation, a termination of participation and/or detect the loss of connection, and initiate a process of retaining the first participant's position, and in some instances retain game states, statistics, attributes, parameters and the like. A second participant can then be cooperated with the active simulation in place of the first participant and resume participation in the simulation in the place of the first participant. Further, some embodiments maintain the first participant's game state, parameters and/or statistics for the simulation and when activating the second participant the second participant can resume participation with the first participant's position and/or statistics being applied relative to the second participant.

The following discussion of embodiments is described with respect to a multi-user or multi-player computer game, such as a video game, hosted by one or more game servers. However, it should be understood that the system and method described herein is capable of being used with any computer simulation, game player, portable device and/or media playback system, as well as any system, device or devices providing users with the ability to participate in a simulation. Similarly, the description below is generally described with reference to one or more users opting to terminate their participation in the simulation. It will be apparent to those skilled in the art that the invention is not limited to the user termination, but can be based on substantially any termination, failure or problem that interferes with a user's ability to effectively participate and/or on detecting a user's failure to interact with the simulation, and in some instances a failure to effectively interact (e.g., where interaction is intermittently received, or other such ineffectively interaction).

FIG. 1 illustrates a simplified flow diagram of a process 110 of providing a simulation or game state transfer from a first user to a second user in response to a termination of a first user's continued participation in a game. As a result, the first user's position, game state (e.g., attributes, scores, statistics and the like) within an active interactive simulation, such as an electronic game simulation, may be saved or otherwise retained so that a second user can join the simulation in place of the first user, effectively taking over the first user's position within the simulation. Again, the first user's termination may result from an intentional termination, a connection failure or other factor inhibiting a user's ability to participate in the interactive simulation. Similarly, a connection failure may be a complete disconnect or may result from an insufficient connectivity, bandwidth or the like (e.g., bandwidth that falls below a threshold level such that the game server cannot accurately implement the user's control during the game simulation), failure at a computer or game console the first user is utilizing to participate in the simulation, a power failure, an inadvertent action by the first user (e.g., inadvertent shutdown of the simulation, game console, computer or the like), or other such failures.

In step 112, a game server receives a notification that a first user intends to terminate participation or detects a termination of participation (e.g., lost connection with the first user). The game server may receive a termination notification from the first user's game console, such as, in response to a user selecting to terminate, during a power down sequence of a game console, other user action and the like. Similarly, a lost connection may be detected through one or more methods, such as periodic tests of connections, detecting a lack of communication over the connection and/or from the first user, the lack of participation by the first user, a direct communication from the first user notifying the server of a problem and/or expected loss of connection, and/or other such methods. In some instances, the direct connect can be over the same communication mode used to participate in the game, while in other instances a second mode of communication may be used. As such, a user may still be connected but the user may have the ability to proactively notify the game server to reserve her position, for example, if the first user knows in advance that her game client is experiencing some issue prior to actually disconnecting and reconnecting, or in case the game server does not recognize the disconnection right away.

In step 114, a gaming position and/or game state of the interactive game associated with the first user is identified. The process continues to step 116 to determine whether the game position can be transferred to a secondary user. When the game state cannot be transferred (e.g., based on a game state, the active game does not authorize position transfers, an identified second user is unknown or other such reasoning) the process 110 terminates. Alternatively, in those instances where the game position and/or state can be transitioned to a second user step 118 is entered where it is determined whether one or more second, replacement users are identified, are known or can be determined that may be joined to the active game in place of the first user. Typically, the one or more second users are not active participants in the interactive game at the time the first position is reserved.

When there are no second users the process 110 terminates. In some instances, a notification may be issued to the first user and/or other users participating in the game that a second user is not being joined. Step 120 is entered when there is a second user, where the first position is reserved for the second user. In many instances, a game state may also be identified, stored and/or otherwise maintained in step 120.

The second user can then join the game in place of the first user in the reserved position. Further, in many instances a game state transfer occurs where some or all of the game states associated with the first position can be transferred to the second user and/or be under control by the second user (e.g., states associated with a character or avatar within the game simulation). In some instances, however, the reserved position may be released as a result of one or more factors, such as a second user failing to join within a threshold time period, a second user failing to confirm her/his intentions to join the game or failure to confirm with a threshold time, a second user not having the clearance or account level to take advantage of reserved positions, and other such factors.

The reserved game state can include substantially any relevant information pertaining to the first user, the active game, a position within a game, one or more teams, scores, levels, virtual characters, attributes (e.g., characteristics, features, money, treasures, virtual equipment, powers, and the like), names, and/or other such state information. For simplicity, the below description will refer to game state; however, it will be appreciated that the game state can be substantially any relevant information that is relevant to an active game, the first position and/or aids in allowing a second user to join an active game and participate in the active game.

By retaining the first position and/or the game state the game server can allow the second user to connect with the game server and join the active game with no or limited disruption to the game, and/or the first position and status within the game. It is noted, that in some instances one or more penalties, fines or other such consequences may be assessed to the second user in order to maintain the first position within the active game as further described below. The second user, however, can join the game to participate in the active game, and in some instances, maintain the position on a team within the game.

Figure 2:
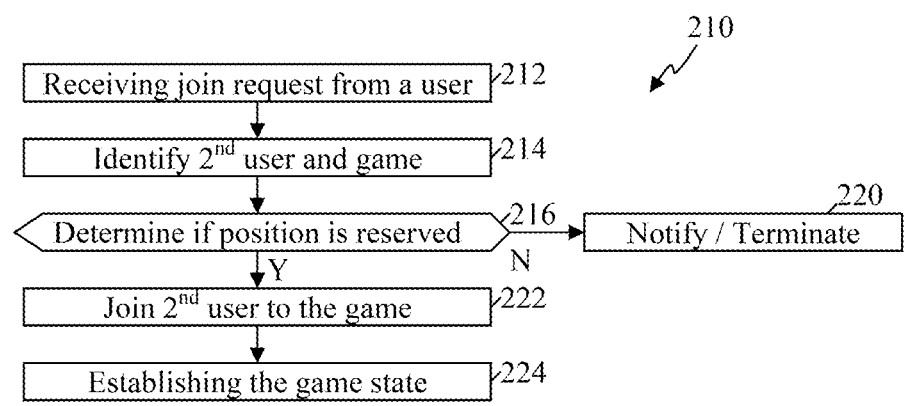
FIG. 2 depicts a simplified flow diagram of a process, in accordance with some embodiments, of allowing a second user to join an active game in a reserved position.

FIG. 2 depicts a simplified flow diagram of a process 210, in accordance with some embodiments, of allowing a second user to join an active game in a reserved position. In step 212, a game server detects an attempt by a user to join an active game. In step 214, the second user is identified and the game or simulation the second user is attempting to join is identified.

In step 216, it is determined whether a position within the active game has been reserved and/or a game state transfer authorized for the identified user. In some instances a position may have previously been reserved for the second user but due to one or more factors, such as time thresholds or other factors the opportunity for the second user to join in the reserved position may have been expired, the position may have been made available to another user or some other factor. When a position is not reserved the process terminates in step 220. A notification may in some instances be forwarded to the second user letting the second user know that a position is not reserved for the user. Additionally, when there is availability to join the second user to the active game, even though a position is not reserved for the second user, one or more other processes can be triggered to allow the second user to join as a new participant in the game.

When it is determined in step 216 that a position is reserved for the identified second user, the process 210 advances to step 222 where the second user is joined to the active game in the reserved position. In step 224, a game state associated with the second user is established. In some embodiments, a game state associated with the second user is configured based at least in part on a game state identified, maintained and/or otherwise stored when the first position is reserved. For example, the maintained game state corresponding to the first position is applied and established for the second user. Once joined to the interactive game in the first position that the second user is capable of actively participating in the interactive game relative to the first position and is capable of providing at least some control over the interactive game corresponding to the first position.

With the reserved game state and/or position the second user can join the interactive game and be incorporated into the reserved position. Further, in some embodiments, the game state of the second user within the interactive game can be set to correspond to the stored game state of the first user. For example, the second user may be associated with a character or avatar within the game simulation that was previously controlled by the first user. Similarly, characteristics, score, capabilities and other aspects and or states that previously were associated with the first user and were stored can be utilized in establishing the state of playback of the second user.

As a result of receiving the notification of termination, some embodiments may notify the second user that a reserved position is available and that the second user can join the active game in the reserved position. Further, the second user may have to respond confirming the second user's intent to join the game in the reserved position. This allows the game server or other service providing the interactive simulation or game to retain the reserved position for the second user or identify another user when a confirmation is not received or the second user rejects the opportunity to join the game. The notification to the second user and/or the confirmation may occur over a communication channel, link or mode that is being used by the users to participate in the active game. In other instances, the notification and/or confirmation may occur over a secondary mode, link or channel that is different than the connection between the game server and the users' game devices, consoles or other devices. Still further, the confirmation received at the game server and from the second user may be received in response to an inquiry or request over the secondary mode of communication from the game server, alternate device or a third party device as described in detail below.

Figure 3:
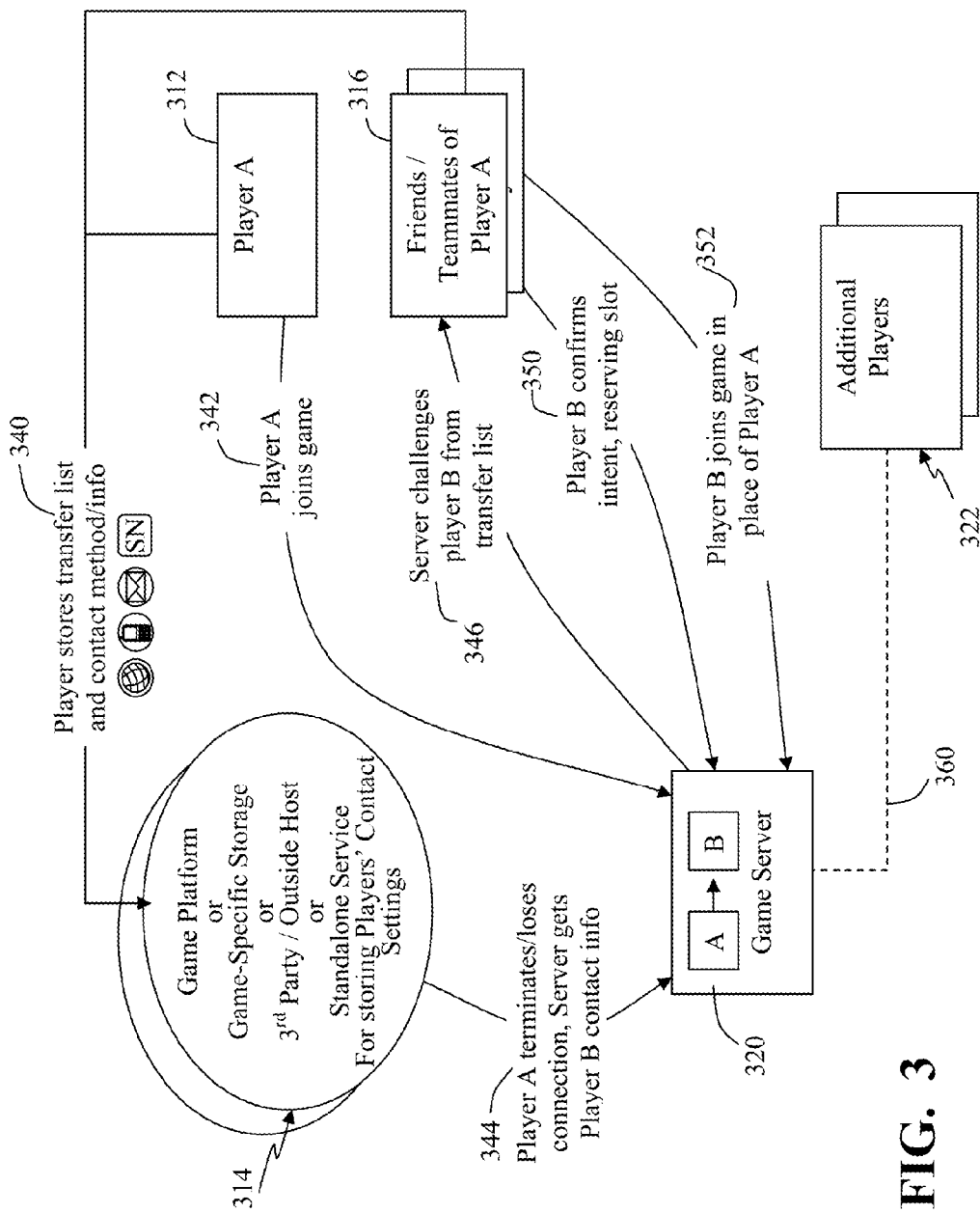
FIG. 3 is an illustration of communications between system components in reserving a first user's position and joining a second user to an active game in the reserved position according to some embodiments.

FIG. 3 is an illustration of communications between system components in reserving the first user's position and joining a second user to an active game in the reserved position. In some embodiments, a first user or first user's device (e.g., a game console or player) 312 provides, in step 340, to a game platform, game service, third party or outside hosting device(s), and/or other third party service 314 a transfer list or otherwise identifies one or more alternate or second users 316 for which the first user's position may be reserved. Additionally, in some instances the first user 312 can further provide one or more alternate or secondary modes of communication to the game service and/or one or more third party services 314. The identified secondary modes of communication can include substantially any mode of communication that is different from the connection utilize by the users in participating in the interactive game. For example, the alternate communication mode can include one or more of, but not limited to, telephone communication, wireless and/or cellular communication, text messaging, short message service (SMS), email, game platform messaging mechanisms, fax, social networking (SN) applications and/or Internet sites, game or game platform Internet sites, one or more other game players in the active game, and other such modes or combinations of such modes. Further, the one or more secondary modes of communication may be defined through a registration process and/or upon initially joining a simulation.

Additionally, in some instances, the first user 312 may provide one or more secondary modes of communication for use in communicating with one or more of the second users 316 identified by the first user 312. In some embodiments, one or more second users 316 can alternatively or additionally provide one or more secondary modes of communication to a game platform, game service, third party or outside hosting device(s), and/or other third party service 314. For example, the second user 316 in attempting to join a game can be requested to provide the secondary mode of communication, even when a position within the game is not currently available to the secondary user. Similarly, the request from the second user 316 for the alternate mode of communication may occur as a result of the second user being unable to join the game (e.g., no further positions available).

The server, in step 342, activates an interactive game in response to instructions from the first user 312 and/or allows the first user to join an already active interactive game over a distributed network being hosted by one or more game servers 320. Upon detection at the game server 320 of a notification of the first user's termination of participation or intent to terminate participation (e.g., detecting that the connection with the first user is lost, a notice from the first user that the first user has to exit the game, etc.), the game server in step 344 identifies one or more alternate or second users 316, and when relevant the secondary modes of communication and the corresponding information to implement the communication (e.g., phone number, email address, and the like) with the second users. As depicted in FIG. 3, the game server 320 may acquire the identification of one or more second users 316 and/or communication information for the second users from the game platform, storage or third party service 314. In other instances, however, the game server 320 can maintain this information locally or in digital storage accessible by the game server.

The game server 320, in step 346, then communicates with a second user 316, for example, over the secondary mode of communication. In some instances the communication includes a challenge message requesting that the second user 316 confirm her/his intention to take advantage of the game state transfer and join the game in place of the first user. The second user 316 can issue a confirmation in step 350 confirming the second user's intent to join the game. The second user 316 then initiates to join the game in step 352. As described above, in some instances the game server 320 continues to allow other users 322 to continue to participate, in step 360, in the interactive game while requesting confirmation for the second user 316 and/or while joining the second user 316 and implementing the game state transfer. Similarly, the first user 312 may continue to participate while the game server 320 joins the second user 316.

In some embodiments, a third party service can communicate with the first and second users regarding obtaining contact information and/or the transfer list. Further, the third party service 314 may be utilized in attempting to obtain a confirmation that the second user 316 intends to join the game in place of the first user. This may be initiated by the game server 320 communicating with the third party service 314. This allows the third party service to obtain and retain the first and second users' secondary mode(s) of communication and relevant contact information, and frees up the game server and/or a game platform from having to perform these tasks and retain the information. In other instances, however, certain levels of access, account status, upgrades and/or payment by the users is a condition for allowing the users to participate and take advantage of game state transfers. In these instances, it may be beneficial for the game platform and/or server to maintain the users' information. In yet other instances, however, the game server and/or game platform can confirm that a first and/or second user has the sufficient account status or has paid the fees prior to contacting the third party server to initiate the request for the confirmation, or the third party service may verify that the first user can authorize a game state transfer and/or the second user can join a game through the game state transfer.

Figure 4:
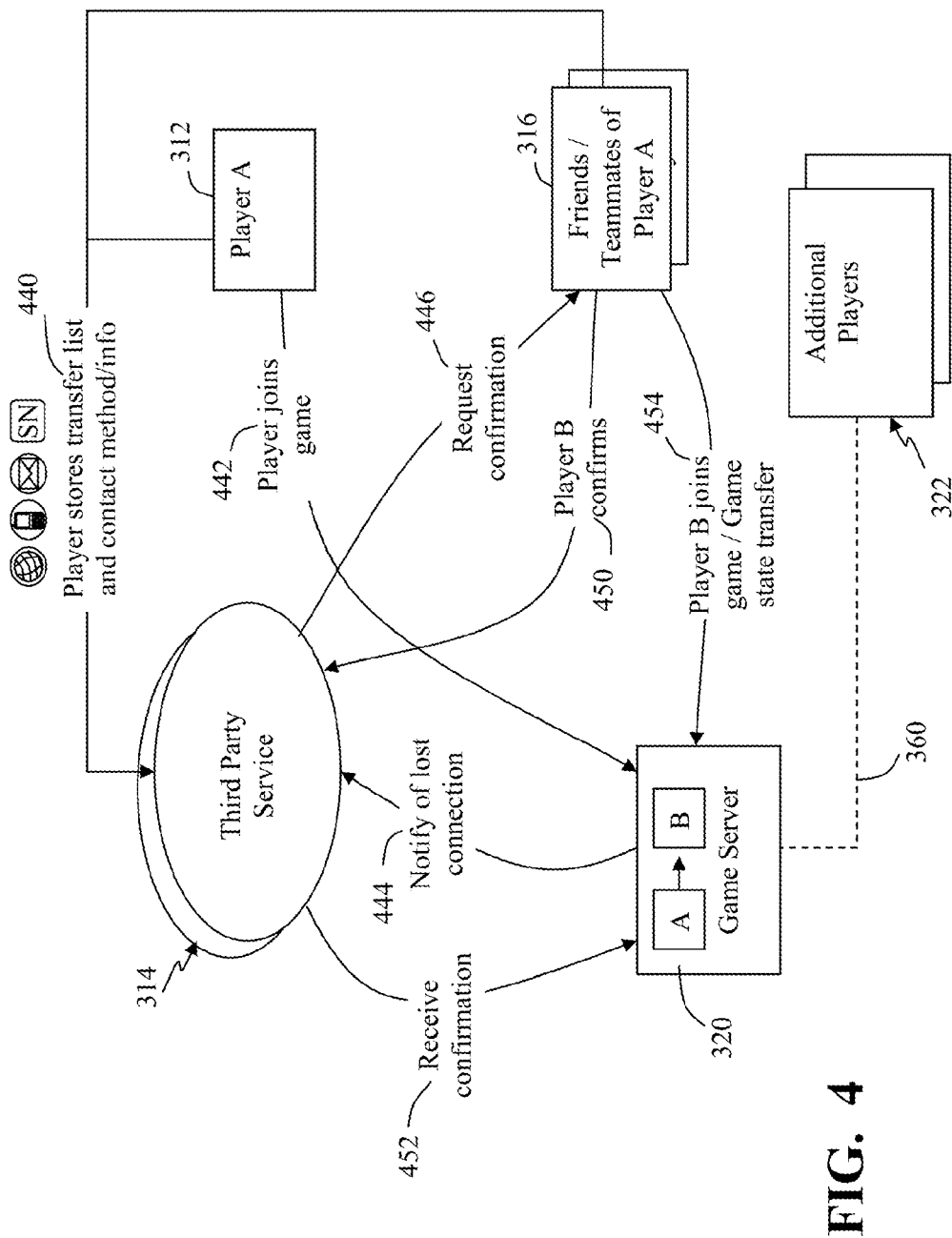
FIG. 4 is an illustration of communications between system components in reserving a first user's position and joining a second user to an active game in the reserved position according to some embodiments.

FIG. 4 is an illustration of communications between system components in reserving a first user's position and joining a second user to an active game in the reserved position according to some embodiments. A first user 312 provides, in step 440, a transfer list of one or more second users for which the first position is to be reserved. The identification of second users and/or a transfer list can additionally identify a priority for the identified second users so that the system attempts to join the second users according to the priority. As further described below, the priority may additionally or alternatively be designated by other users, based on user history, when second user's requested to join and other such priority schemes or combinations of such priority schemes.

In some instances, the first user 312 additionally provides one or more alternate or secondary modes of communication to one or more third party services 314. Alternatively or additionally, the one or more second users 316 can provide secondary modes of communication. Further, the second users 316 can also provide a transfer list or identify other second users to take their position should they terminate or loss connection and do not rejoin.

The first user 312, in step 442, joins or activates an interactive game over a distributed network being hosted by a game server 320. In some implementations, the first user 312 may be instructed by the game server 320, in response to receiving the request to join or activate a game, to provide the transfer list, secondary mode of communication and/or register with the third party service 314. Similarly, the one or more second users 316 may also be notified requesting they register with the third party service 314 (e.g., in response to the first user identifying them as alternate users).

Upon detection at the game server 320 that the first user 312 intents to terminate participation and/or the detection that the connection with the first user is lost, the game server issues, in some implementations, a notification in step 444 to the third party service 314 that the first user's participation is terminating and/or a connection with the first user device 312 has been lost. The third party service 314, in response to the notice, identifies the first user 312 and one or more second users to which the game state can be transferred. Further, the third party service 314 identifies one or more corresponding secondary modes of communication for the second user or users 316. In some embodiments, the third party service 314 selects one of the second users and issues a request, in step 446, for confirmation from the second user 316 that the second user intends to join the active game in place of the first user. Other embodiments may issue requests 446 to multiple second users, and a second user can be selected by the third party service 314 or the game service 320 according to a prioritization based on responses received from the second users (e.g., based on prioritization specified by the first user 312 or additional users 322, order of received confirmations, duration second users have been waiting, account levels of second users, or other such prioritization or combinations of such prioritization).

The one or more second users 316, in response to the request, can issue a confirmation in step 450 confirming the second user's intent to join the game. As described above and further below, one or more threshold time periods may apply in receiving the confirmation from a second user. Upon receipt of the confirmation the third party service 314 issues, in step 452, a notification to the game server 320 that the second user 316 has confirmed an intention to join the game. The second user 316 then issues a request to the game server 320 to join the game, in step 454, in place of the first user 312. Again, the joining of the second user may be limited by one or more threshold time periods, such as a first time period to confirm the second user's intent to join the game, and a second time period to join the game.

The ability to transfer a game state and/or position to another user can greatly enhance the playback experience for multiple users. Further, the game state transfer and reserved position allows the level of playback to be maintained and/or improved, and in some instances may avoid termination of the game as a result of a lost user. Additionally, the position reservation allows users to have greater control over their playback experience and other users with which they participate and interact. For example, a group, team or clan participating in a game can maintain control over who joins a game on their team or clam so that they play with members of their group, team or clan, and/or also allows the users to maintain a level of playback by reserving positions for users that they believe have a desired skill level.

Furthermore, the ability to reserve positions provides the game server and/or service with greater capabilities that can attract users to their service. Similarly, the availability of reserving a position and/or providing a game state transfer may be an enhanced feature provided by the game server and/or service, which may have conditions for use, such as a cost, users may have to have a certain account level, player experience, player reaching a certain level or score, repeat user status, player participation, and other such factors and/or conditions. As a result, some embodiments confirm that a first user and/or second user can take advantage of the game state transfer. For example, a verification that users can utilize the game state transfer can be performed as part of one or more of steps 114, 116, 118, 120, 214, 216, 340, 342, 346, 440, 442, 444 and/or 446, or implemented as one or more additional steps.

Accordingly, determinations can be made regarding whether a first user should be allows to reserve her or his position and/or provide a game state transfer, and/or whether one or more second users should be allows to join an active game in place of a first user. These determinations can be performed at the time of initiating the reserving, at the time of determining whether to contact a second user, at a time prior to a game activation, at a time a user registers with a game server, game service or third party service or other such times.

As examples, the determination of whether a position can be reserve and/or a game state can be transferred can include one or more considerations and/or factors such as, but not limited to, one or more time thresholds, whether the game is still active, the first and/or second users' authentication, the first and/or second users' account status, the first and/or second users' membership or account level, whether payment has been received, authorization by one or more other users 322 participating in the active game, connection and/or network capabilities, system capabilities, game console capabilities and other such factors or combinations of such factors.

When a game state transfer is implemented the second user 316 is joined to the active game. Further, some or all of the reserved or recorded game state(s) and/or parameters associated with the first position and/or first user can be reestablished and associated with the second user 316. In some instances, the exact game state and/or parameters reserved may not be reestablished as a result of, for example, penalties, the need to maintain participation or other such factors as described above and further below. For example, in order to maintain the reserved position within the game one or more actions within the game may be required that could reduce a score, count, total, dollar amount or the like (e.g., continuing to bet during a gambling game simulation, using resources such as firing a weapon or using a special power, and the like). Similarly, the system may have implemented actions on behalf of the reserved position to retain the reserved position and/or limit or prevent adverse consequences occurring to the reserved position, a character within the game, and/or other users participating in the game.

Figure 5:
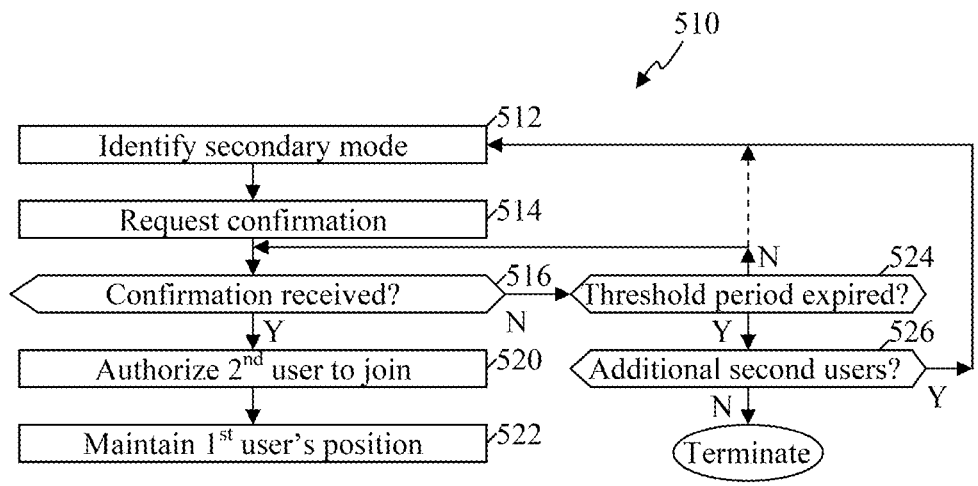
FIG. 5 depicts a simplified flow diagram of a process of determining whether a second user intends to take advantage of a game state transfer and join a game in place of a first user.

FIG. 5 depicts a simplified flow diagram of a process 510 of determining whether a second user 316 intends to take advantage of a game state transfer and join a game in place of a first user. In some implementations, the process 510 is implemented in response to receiving a notification from the first user 312 of the first user's intent to exit the active game and/or in response to detecting a loss of connection with the first user. In step 512, a secondary mode of communication is identified for communicating with the second user 316. In step 514, a challenge or request is issued, using the secondary mode of communication, requesting confirmation that the second user 316 intends to join the active game. Again, this request provides the second user 316 the opportunity to confirm her intent to join the game and to maintain the first position for the second user (which may be limited by a threshold time period).

In step 516, the process determines whether a confirmation is received from the second user 316 confirming the intent to join the active game. Typically, this confirmation is received over the secondary mode of communication. For example, the second user can respond with a verbal or tone command (e.g., when the secondary mode of communication is via telephone or cellular phone); the second user can respond through text message and/or short message service (SMS) (e.g., respond with a numerical or other predefined code response via a text message); email; game platform messaging mechanisms; fax; social networking applications and/or websites; game, game platform and/or game service website; another game participant 322 participating in the active game (e.g., acting on behalf of the second user); or other such confirmations. It is noted, in some instances, the communication mode over the distributed network that is used to participate in the interactive game can also provide the confirmation of a second user's intent to join the game when the second user previously established or establishes a connection over the communication mode.

In those instances where confirmation is received the process advances to step 520 where the second user 316 is authorized to joining the interactive game. This authorization, in some embodiments, is conditioned on the second user qualifying to take advantage of game state transfers, such as having paid a fee, having a user account level that allows the second user to utilize the game state transfer feature, other users 322 have authorized the second user 316 to join and/or other such factors or combinations of such factors. In step 522, the first position within the simulation associated with the first user is maintained, and in some instances, prevents an application (e.g., matchmaker software) from identifying the first user's vacated position as an open slot for new players, prevents other game players from switching teams and/or slots into the first user's position, and/or otherwise taking action that would prevent the second user 316 from joining into the first position within the game in place of the first user 312. Further, the first position is typically maintained for the second user as a result of the received confirmation from the second user.

The second user 316 can then attempt to join the active game. In some embodiments, the process 210 is activated upon detection that the second user is connecting with the game server 320. Some embodiments further employ one or more additional threshold time periods within which the second user has to join the game. This second threshold time period can be measured from the time the notification of the termination, from the detection of a lost connection, from the time the second user 316 is authorized to join in place of the first user, from the time the second user's confirmation is received, from some other time or combinations of such thresholds. Further, this second threshold time period can be employed to limit and/or avoid prolonged inactivity associated with the first position and/or adversely affecting other user's playback experiences.

Still referring to FIG. 5, in some implementations, when it is determined in step 516 that a confirmation has not been received the process 510 enters step 524 where it is determined whether a confirmation threshold time period has been exceeded or expired. When the confirmation threshold has not been reached the process 510 returns to step 516 to determine whether the confirmation is received, and/or in some instances may return to step 512 to identify an alternative secondary mode of communication (e.g., if an initial threshold has been reached but the first threshold has not been reached, the game server may initiate a confirmation request with an alternative secondary mode of communication).

When the confirmation threshold has been reached in step 524 the process 510, in some embodiments, terminates. In other embodiments, the process 510 may advances to step 526 to determine whether one or more alternative second users 316 are defined by the first user 312 or another user 322 in a transfer list, or otherwise specified or identifiable. When an alternative second user is identified the process returns to step 512 to identify a secondary mode of communication for the alternate second user and to step 514 to issue a request for confirmation. Again, one or more thresholds may apply. Further, an additional threshold may prevent alternative second users from being contacted, which for example can avoid delays and/or adverse playback effects on other users 322 participating in the active game.

Figure 6:
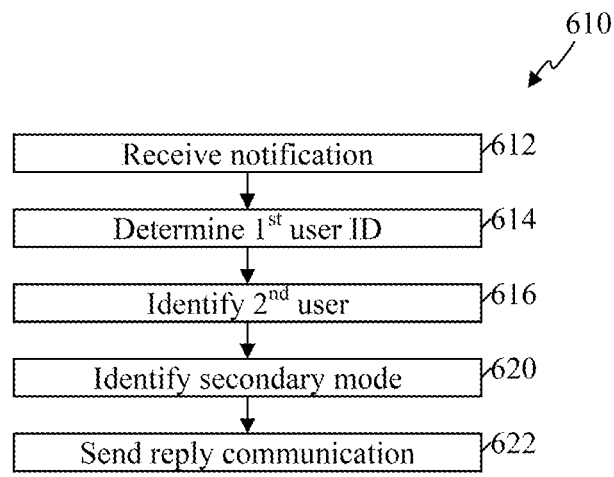
FIG. 6 depicts a simplified flow diagram of a process of a remote source, such as a third party service, providing an identification of one or more second users to a game server.

FIG. 6 depicts a simplified flow diagram of a process 610 of a remote source, such as a third party service 314, providing an identification of one or more second users to a game server 320. In some instances, the third party service 314 additionally provides information regarding the secondary mode of communication associated with the one or more second users. The game server 320 and/or game service may provide information about one or more users to a third party service and/or as described above the users, in some instances, may register or otherwise provide a third party or third party service with information regarding one or more secondary modes of communication.

The third party service can be substantially any third party service that is associated with the game server 320 or completely separate from and unassociated with the game server. For example, the game server 320 can be a game server provided by Sony® (e.g., accessed via an Internet site (e.g., game1.sony.com)) while Sony® further provides a separate service (e.g., accessed via an Internet site (e.g., register.sony.com)) that allows users to register with the service, which can include providing the registration service with one or more secondary modes of communication and corresponding communication information (e.g., cellular communication and a corresponding cellular phone number). In other embodiments, the third party service 314 may be a social networking service (SN) that is not associated with the game server 320 or a company providing the game or game server. For example, the company providing the game server may establish a profile on the social networking service that users can access and register at least the one or more secondary modes of communication. In yet other embodiments, a third party service 314 is unassociated with the game server 320 and the company providing the game or game server, and users can access and register with the separate third party service. The cooperation with a third party server and/or service can allow access from multiple game servers, gaming and/or other device platforms, social networks, competing companies, and the like, providing users with flexibility and compatibility.

Further, the additional, remote and/or third party storage and/or the third party service 314 optionally acts, in some embodiments, as a central dispatch. This central dispatch could remove the need for users participating in simulations to know the digital address or communication mechanisms for each game server 320. Instead, the game server 320 communicates with the central dispatch when a user connects, so that the central dispatch knows how to reach the user and/or the user's playback device or console. When a termination notice or disconnect with a first user is detected the game server 320 can notify the central dispatch about the event, and allow the central dispatch to contact the one or more second users and/or the first user. As such, the second users interact with the central dispatch instead of endless numbers of different game servers across their respective game playing experiences.

Still referring to FIG. 6, in step 612 a notification is received at the third party service 314 of a termination, intended termination or lost of connection between the game server 320 and a first user's game console or device 312. This notification does not have to be received from the game server 320. For example, the notification can be received from the first user 312. In step 614, an identification of the first user associated with the termination or lost connection is determined. This can be supplied with the notification (e.g., the game server can provide a user identification), determined from the communication (e.g., based on a source of the communication when the notification is issued from the first user, such as a first user's phone number when the notification is issued from the first user using a telephone or cellular phone), or otherwise identified.

When the first user has been identified, the process continues to step 616 to identify one or more second users 316 that can be granted the ability to join the active game in the reserved first position and in place of the first user. As described above, in some instances, the one or more second users 316 are defined in a transfer list associated with the first user. In other instances, the one or more second users 316 may be identified from a transfer list established for a team on which the first user is participating, a transfer list of another user participating in the active game (e.g., when the first user has not defined a transfer list or identified a second user), or other such sources.

Upon identifying the one or more second users, the process continues to step 620 to identify one or more secondary modes of communication associated with one or more of the identified second users and the corresponding contact information for the secondary modes of communication (e.g., email address, phone number, and the like). In some instances, the secondary modes of communication are identified in a profile established for and/or by a second user. In other embodiments, a database may be maintained by the third party service that associates user identifications with corresponding one or more modes of communication and the contact information.

In step 622, a communication is sent from the third party service 314 to the game server 320 with information defining at least one of the secondary modes of communication and the corresponding contact information (e.g., phone number, email address, account name/number, and/or other such information) for one or more of the second users. This communication can be over the distributed network, a separate network, a dedicated network, an alternate communication mode or other such methods.

In some embodiments, when more than one second user is identified the multiple second users may be prioritized, and based on the prioritization one of the second users may be selected. In embodiments where the third party service 314 is aware of and/or maintains the prioritization, the prioritization may also be forwarded to the game server. The game server 320 can then determine which of the second users to communicate with to request confirmation. Alternatively, the game server 320 may issue communications to multiple second users (e.g., establishing a priority or determining another factor in determining priority, such as based on responses and/or response times). In other implementations, when there are multiple second users identified, the third party service 314 may provide information to the game server 320 for just one of the second users.

Again, FIG. 6 provides a process 610 where a third party service 314 maintains information about how to contact users and supplying information about one or more second users to the game server or service 320. The game server or service then utilizes this information to initiate communication with one or more of the second users. In other embodiments, the third party service 314 may be configured to contact one or more second users to notify a second user of the reserved position and/or to request confirmation that the second user intends to join the game taking advantage of the game state transfer.

Figure 7:
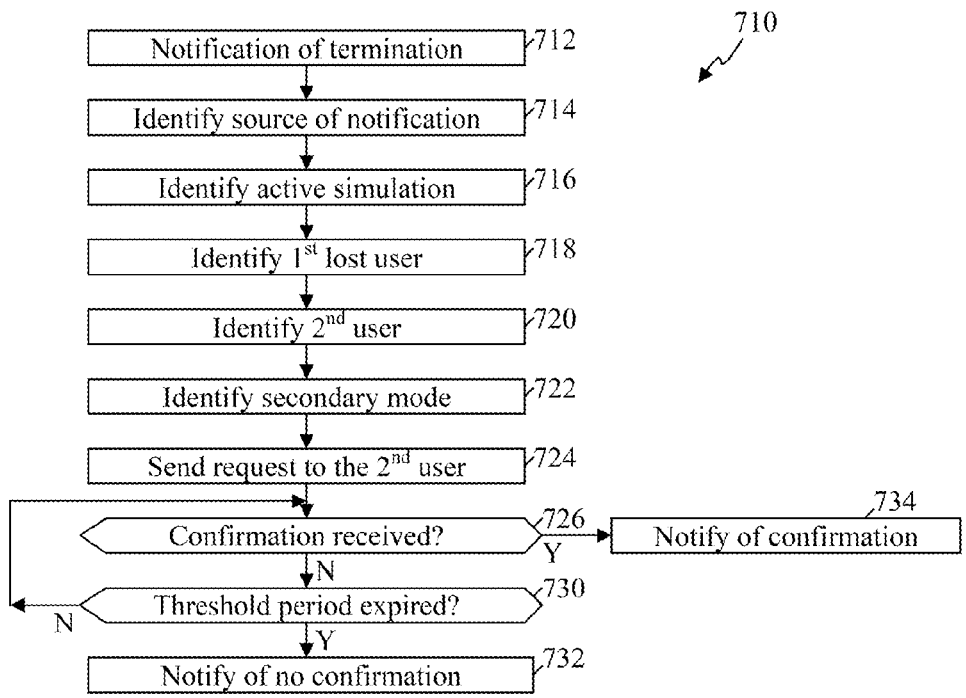
FIG. 7 depicts a simplified flow diagram of a process implemented by a third party service or device to contact a second user to determine whether the second user intends to join the game in a reserved position.

FIG. 7 depicts a simplified flow diagram of a process 710 implemented by a third party service or device 314 to contact a second user 316 to determine whether the second user 316 intends to join the game in a reserved position. Again, in some instances the contact with the second user employs a secondary mode of communication. In step 712, the third party service or device 314 receives notification of a termination or the lost connection for a first user 312. Typically, the notification is issued from the game server 320 or other device associated with the game server.

In step 714, the source sending the notification is identified. In step 716, the active game, simulation and/or application in which the first user 312 was participating is identified. In step 718, the first user 312 for which the termination or lost connection is detected is identified. In some embodiments, the game server, the game and the first user are identified from the initial notification. In other instances, a series of communications may be exchanged to obtain this information. For example, in response to the notification the third party service 314 may issue an acknowledgment and in response to the acknowledgment further information may be supplied to the third party service 314. The use of the acknowledgment may improve the ability to obtain the confirmation from the second user 316 by allowing the game server 320 to issue a notification to multiple third party services and receive an acknowledgment from a service having the capacity to request confirmation from the second user (e.g., request in the shortest amount of time). Alternatively, should an acknowledgment not be received from an initial third party service the game server 320, in some implementations, may be able to issue a subsequent request to an alternative third party service or device.

In step 720, one or more second users 316 associated with the first user 312 as replacement users and designated to join the game in place of the first user are identified. Again, the one or more second users can be identified in a list provided by the first user 312, other users 322 or combination, users can be registered as part of a team or clan, or other such identification or combinations of such identification. In some instances, the first user before termination may be provided a list of potential replacement users and the first user can select a second user or identify a ranking or priority of replacement users.

In step 722, one or more secondary modes of communication associated with the one or more second users 316 are identified. In step 724, a request is sent to the identified second user 316, or sent to multiple identified second users 316 when multiple users are to be contacted, using one or more of the identified secondary modes of communication, and requesting confirmation that the second user intends to join the game in the reserved first position. As introduced above, there may be instances where multiple second users are notified and based on the responses one can be selected and the first position reserved for the selected second user. In some instances, the request for conformation forwarded to the second user can include information regarding the reserved position, the first user, the current state of playback of the game, game parameters and/or conditions, and/or other such information. This information may aid the second user 316 in deciding whether the second user wishes to join the game. For example, when the game state is such that a character or avatar within the game is close to being eliminated from the game, the second user 316 may elect not to join knowing that it is likely the second user's participation is going to quickly terminate.

The process 710 continues to step 726 to determine whether a confirmation is received from the second user 316. Typically, this confirmation is received over the secondary mode of communication. Other communication modes can be used and/or the confirmation may alternatively be received directly at the game server 320. When a confirmation is not received the process advances to step 730 to determine whether a confirmation threshold period of time has been reached or has expired. In some embodiments, the confirmation threshold period at the third party service 314 may be different than a confirmation threshold period at the game server 320. In those instances where the confirmation threshold has not been reached the process returns to step 726 to determine whether the confirmation is received. Some embodiments may utilize an alternate or additional secondary mode of communication if an initial threshold time has expired, where the initial threshold time is less than the confirmation threshold from step 730 (e.g., returning to steps 722 and 724 if the initial threshold time has expired to identify the alternate secondary mode of communication).

When the confirmation threshold has been reached a notification is communicated in step 732 to the game server 320 notifying the game server that no confirmation was received. A mode of communication with the game server may be specified in the notification received in step 712 or some other communication from the game server or a previously defined mode of communication. Further, the notification that a confirmation was not received can additionally identify the first user 312, the second user 316 or users, the game and/or include some other identifier, such as an identification of the notice of termination, so that the game server 320 can accurately identify the game and/or the first user 312 for which no confirmation is received. When a confirmation is received in step 726, the process continues to step 734 where a communication is sent to the game server 320 notifying the game server of the confirmation that the second user has confirmed her/his intend to join the game in the first reserved position. Again, the notification can identify the game, the first user 312, the second user 316 and/or other identifying information.

Shifting the process of requesting confirmation from a second user to a third party service 314 can free up the game server 320 and the resources of the game server. Similarly, in some instances the game server does not have to maintain modes of communication and/or communication information for the second users 316. The game server, in some implementations, may not even need to maintain the listing of potential second users 316 associated with the first user 312. Additionally, the game server does not have to try and initiate the contact with the second user, which may free up communication and processing bandwidth.

Some embodiments take into consideration other users 322 participating in the game when a first user 312 terminates or loses connection with the game server 320 and in determining whether to reserve the first position for a second user 316. This can include considering whether the first user intends to rejoin the game, whether the first user is expected to continue to participate in the game while the second user is being joined, how the lack of the first user's participation may affect other users 322, how the first user's continued lack of participation while waiting to allow a second user 316 to join the game may affect other users, whether other users 322 want to wait for and/or allow the second user 316 to join the game, and/or other such considerations. These considerations additionally may vary depending on a state of the game, the game state associated with the first user, the game state associated with the first user relative to the game state of one or more other users 322, and other such factors. For example, when the game the first user is participated in is a team game and the first user, at the time of the detection of the termination, has a leadership roll or otherwise has a dominate roll, the continued absence of participation of a second user in place of the first user while waiting for the second user to join may have significant effects on other users 322; while in other instances or states of a game the absence of the first user may have no or little adverse effects on other users.

Figure 8:
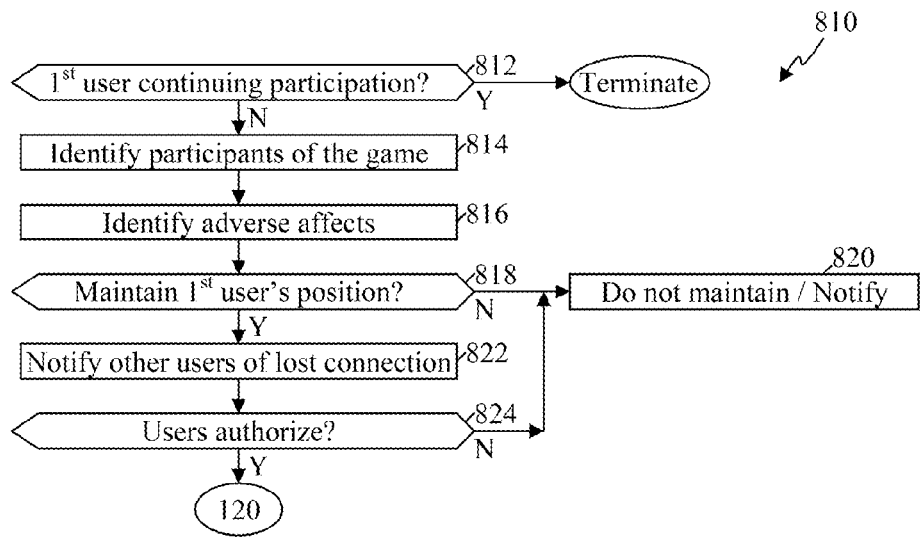
FIG. 8 depicts a simplified flow diagram of a process, according to some embodiments, taking into consideration other users in determining whether to reserve a first position.

FIG. 8 depicts a simplified flow diagram of a process 810, according to some embodiments, that takes into consideration other users in determining whether to reserve a first position associated with a first user and/or allow a second user to join the game in the reserved position. The process 810 can, in some instances, be implemented as part of step 116 of the process 110. In step 812, it is determined whether the first user 312 is expected to continue to participate until the second user 316 can be joined to the game. As described above, in some instances a first user 312 may issue a notification that the first user intends to terminate the first user's participation in the active game. The notification, however, may not be a termination of participation. Instead, the first user may be providing the game server with time to identify and join a second user while the first user continues to participate in the active game. This notification may include a request to reserve the first position associated with the first user and initiate the game state transfer from the first user 312 to a second user 316. In other instances, the game server 320 initiates the process to reserve the first position and identify a second user in response to the notification of termination. As such, when it is determined in step 812 that it is expected the first user 312 is going to continue participating while a second user 316 is joined the process 810 terminates because it is expected that the adverse affects of the lack of the first user's participation is eliminated or minimized. In some instances, a notification to the other users 322 may additionally be issued, and/or one more steps of the process 810 may be implemented, such as requesting authorization in step 824 from the other users 322 to reserve the first position, whether to join a second user in the first position and/or to join a specifically identified second user into the first position.

When it is determined in step 812 that the first user's continued participation is not expected and/or adverse affects to the other users 322 are expected, the process 810 continues to step 814 where one or more other users 322 participating in the active game are identified. In step 816, adverse affects to the identified one or more other users 322 are determined should the first user's position be reserved while waiting for the second user 316 to join in the reserved first position. In step 818, it is determined, based at least in part on the adverse affects, whether to maintain the first user's position and game state. For example, the game server or system 320 can determine whether the lack of the first user's participation will prevent one or more other users 322 from continuing to accurately participate in the game, whether the first user's lack of participation may result in an advantage (e.g., to an opposing team or clan), whether the lack of the first user's participation may result in a significant loss of points or status, whether there is a limited number of other users (e.g., one, a few users, etc.) and the loss of the first user would significantly degrade the experience of the other users 322, and other such factors and/or considerations. In those instances where it is determined not to maintain the reserved first position step 820 is entered where the game state associated with the first user is not maintained and a second user 316 is not provided the ability to join the game in the reserved first position and take advantage of the game state transfer. In some instances a notification may be issued to the first user 312, second user 316 and/or other users 322 indicating that the second user is not going to be joined in the first position. Further, one or more reasons may also be provided why the second user cannot be joined.

Alternatively, when it is determined in step 818 that the first position should be maintained (e.g., temporary absence from the game is allowed or the adverse effects are below a threshold tolerance) the process 810 continues, in some implementations, to step 822 where the one or more other users 322 are notified of the first user's termination. Further, some embodiments optionally include step 824, where it is determined whether the one or more other users 322 authorize maintaining the first position for the second user. This determination can vary depending on the parameters of the game, the game set-up (e.g., as set up by an initial user), game states and/or other such factors. For example, the determination can be based on a majority decision by the one or more other users 322, be based on a single vote to maintain the first position, be based on a single vote not to maintain the first position, or the like. In response to determining that the game state and first position are not to be maintained the process continues to step 820.

The first user's game position and/or game state are maintained when it is determined that the first position should be reserved for the second user 316, such as in response to receiving input from the one or more other users 322 that the first position should be maintained for the second user. For example, in some instances the process 810 shifts to step 120 of process 110 of FIG. 1. In some implementations, the communication with the second user 316 to request confirmation that the second user intends to join to the game in the first position is postponed until determining whether the one or more other users 322 authorize the maintaining of the first position and/or authorizing the second user to join the game.

The identification of one or more second users 316 can be based on the first user 312 specifying one or more replacement users (e.g., in a transfer list), identified by a first user 312 at the time of notifying the game server 320 of the first user's intent to terminate participation in the game, in response to the game server 320 requesting the first user 312 to identify a replacement user, designations of one or more second users 316 from one or more other users 322 (e.g., from one or more transfer lists associated with other users, inquires by the game server, or the like), users attempting to join an active game when there is no longer openings in the game to participate, users registered as part of a clan or team and not participating in the active game, or other such identifications or combinations of such identifications. In some instances, the game server 320, game service and/or a third party service 314 may obtain a transfer list or identification of one or more second users in response to a first user 312 registering with the game server, game service and/or third party service, the first user joining a game, an establishment of a team and/or other relevant times where the second user can be designated. The list of second users can be altered, discarded, or replaced over time. Again, this registration can occur at the time of join a game, when registering with a game server, when registering with a third party service, when establishing a user profile, prior to joining the game, during a game, at the time of initiating termination, and/or other relevant times.

Further, in some instances a first user, group, team or clan of users may have to meet criteria or have certain levels of access or authorization to take advantage of the game state transfer functionality and features. Additionally or alternatively, the second user 316 may have to meet criteria or have certain levels of access or authorization to take advantage of the game state transfer functionality and features.

Figure 9:
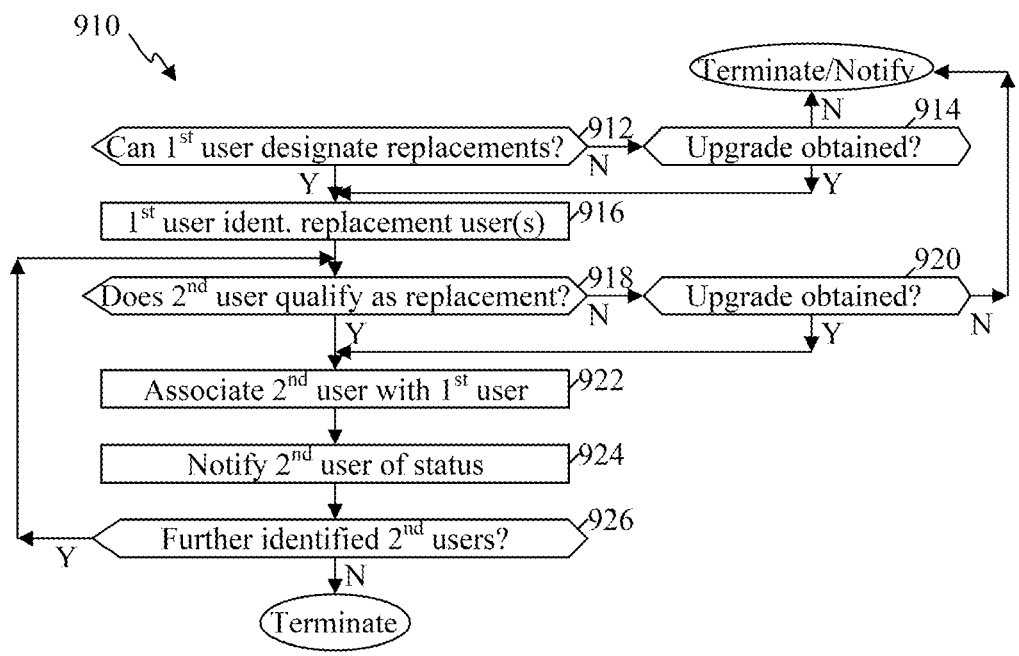
FIG. 9 depicts a simplified flow diagram of a process according to some embodiments of obtaining a transfer list from a first user.

FIG. 9 depicts a simplified flow diagram of a process 910 according to some embodiments of obtaining a transfer list from a first user 312. In step 912, it is determined whether the first user is authorized to designate one or more replacement users. Again, in some instances the first user may have to meet certain criteria or access level. For example, the first user may have to have a certain account level, qualify as a frequent user, paid a certain fee, or other such criteria or combinations of such criteria. Alternatively or additionally, the first user may have to be a member of a team or clan that meets one or more similar criteria. In some embodiments, one or more other users 322 may have to provide authorization to allow the first user 312 to identify one or more second users as replacement users. When it is determined that the first user 312 is unable to designate one or more second users as replacement users the process 910 terminates, or may enter optional step 914 to determine whether the first user 312 can upgrade her/his account, pay a fee and/or meet other criteria. When the upgrade is not obtained the process terminates.

When it is determined that the first user can designate second users as replacement users the process 910 continues to step 916 where one or more second users are received from the first user 312. In step 918, it is determined whether there are criteria and/or conditions that the second user has to meet before being qualified to take advantage of a reserved position of another user and the game state transfer functionality. For example, some embodiments, game providers, game servers and/or games may designate criteria such as identifying the second user as a being considered a frequent player (e.g., where the second user has played a certain number of times and/or amount of time); whether the active game has been active for at least a predefined amount of time; whether the first user has been participating within the active game for a predefined amount of time; whether other spots are available within the game; whether a mode of communicating with the second user is known and/or can be obtained; whether the second user has an certain account level and/or paid fees; and/or other such criteria. When the criteria or conditions are not met step 920 is entered to determine whether the second user updated her/his account and/or took steps to meet the criteria when possible. When the second user does not meet the criteria the process 910 terminates, and in some instances a notification is issued to the first user 312, second user 316 and/or other users 322 that the second user 316 cannot retain her/his position.

Step 922 is entered when the second user 316 qualifies as a replacement user where the second user is associated with the first user 312, such as being incorporated into a transfer or replacement list associated with the first user or a team with which the first user is associated. In some embodiments, the second user 316 is notified in step 924 that she/he is designated as a second, replacement or back-up participant. The notification can identify the game, a state of the game, the first user, the team with which the second user would be associated, other such information or combinations of such information. In step 926 it is determined whether the first user 312 identified other second users. When further second users are identified the process 910 returns step 918 to further evaluate the other one or more second users. Alternatively, the process 910 terminates.

The process 910 is generally implemented from the perspective of the first user 312 designating second users to take over the first user's position. A similar process can be implemented to allow a team, team captain, sub-group or the like to specify replacement users for one or more members of the team that are to actively participate in the game. As such, the team can maintain some control over the replacement users that may join the game through a reserved position.

Figure 10:
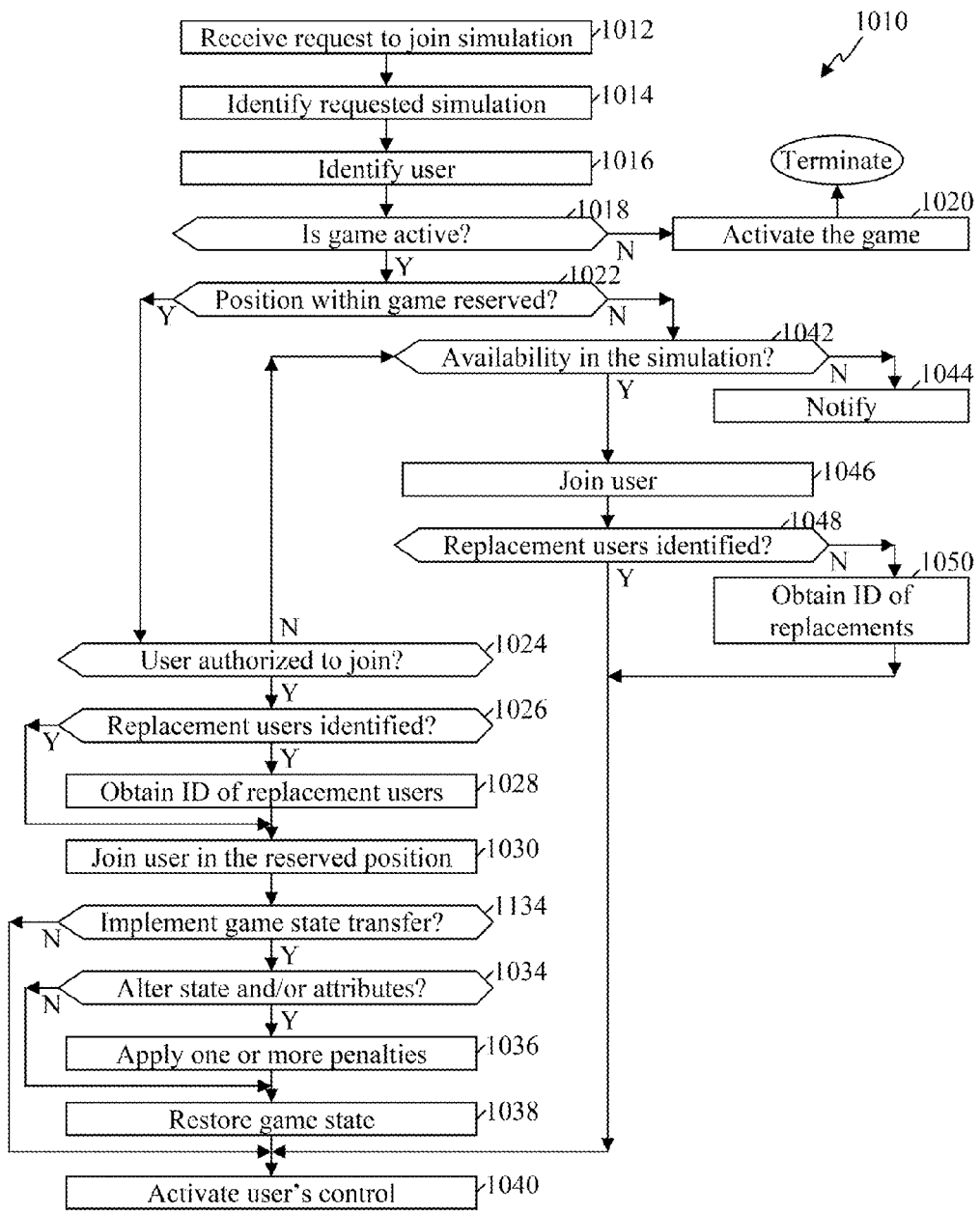
FIG. 10 depicts a simplified flow diagram of a process, according to some embodiments, of adding a user to a game or other simulation.

FIG. 10 depicts a simplified flow diagram of a process 1010, according to some embodiments, of adding a user to a game or other simulation. This process can be implemented to identify those users attempting to join a game in a reserved position. In step 1012, a game server 320 receives a request from a user to join a game or other simulation. In step 1014, the game or simulation that the user is requesting to join is identified. In step 1016, the user is identified. In step 1018, it is determined whether the identified game is active. In those instances where the game is active the process advances to step 1022. Alternatively, when the game is not active the process continues to step 1020 to activate the game. In some instances, the activation may be limited by one or more factors, such as the game being available through the game server, the user having the authority and/or account level to activate a game, other users desiring to join and/or other such factors.

In step 1022, it is determined whether a position within the game is reserved for the identified user. When there is not a reserved position the process advances to step 1042 to determine whether there is availability in the active game to allow the user to join. The process 1010 continues to step 1024 when there is a position reserved for the user where it is determine whether the user is authorized to join the game in the reserved position. Again, some embodiments may have limitations or restrictions on allowing a user to take advantage of reserved positions, such as whether the active game allows reserving of positions, whether a current state of the game allows a user to join in the reserved position, whether the user has the correct authorization and/or other such factors. In those instances when the reserved position cannot be utilized the process advances to step 1042.

When the user can be joined in the reserved position, some embodiments include step 1026 to confirm and/or determine whether a secondary mode of communication is known for the user. Again, some embodiments may instead rely on third party service to obtain the secondary mode of communication as described above. Step 1028 is entered to obtain and store the secondary mode of communication and contact information when the secondary mode of communication was not known or is updated. In other instances the game server may instruct the user to register with the game server and/or third party service 314.

In step 1030, the user is joined to the game in the reserved position. In step 1032, it is determined whether to apply a game state transfer to the user's position and/or participation within the active game. Again, in some instances, the previous user's game state or a portion of the game state and/or parameters may be maintained with the first position and restored to the first position into which the user is being joined. In other instances, the user is joined into the reserved position, and the user has to initiate playback from a starting state, which may depend for example on the current state of the game. When a game state is not to be transferred the process 1010 continues to step 1040.

Alternatively, step 1034 is entered to determine whether the game state is to be altered. In some instances a user's actions, statistics, attributes, game time and/or other parameters are to be altered and/or penalties are to apply. Again, the penalties, lost game time, or other alternations to the game state may depend on the game or simulation, the affects on other users, a state of playback and the like, and can include loss of points, loss of characteristics and/or functionality, loss of virtual money, loss of playing time, change in location within a game's virtual environment (e.g., a virtual world), change in a level within the game or a virtual world and/or other such penalties.

When adjustments are to be apply the process 1010 advances to step 1036 where adjustments and/or penalties are identified and applied. In step 1038, the stored and/or adjusted game state is applied. In step 1040 the user's control within the game environment are activated (e.g., activate joined user's character and user's ability to control the character).

In some implementations, when it is identified in step 1022 that there is not a reserved position for the user and/or it is determined in step 1024 that the user cannot be joined in the reserved position, the process 1010 advances to step 1042 to determine whether there is availability in the game to allow the user to be added. In those instances where there is a lack of availability step 1044 is entered where the user is notified, which may include further instructions (e.g., offers to join a different game, an expected wait time, being added to a replacement list, or other such information and/or instructions). Alternatively, the user is added to the game in step 1046. Some embodiments further include step 1048 to determine whether a one or more replacement users are identified for the user. This step may be limited based on a determination of whether the user can take advantage of reserving her/his position within the game for a subsequent replacement user, whether the game allows a position to be reserved and/or other such limitations. In those instances where a second user is not known step 1050 is entered to acquire and store the identification of one or more replacement users, and when relevant secondary mode of communication and contact information. Again, in some other instances a game server may rely on another device, service and/or a third party service to acquire and/or maintain the user's designation of replacement users, a team listing of replacement users may be designated, another user (e.g., a team captain) may designate replacement users, or other such designations. The process 1010 then advances to step 1040 to activate the user's control within the game.

In some embodiments, the game server 320 or other device providing at least partial control of the simulation may take different actions in response to detecting the notification of termination of the first user's participation. In some instances, the game server 320 may allow the first user 312 to continue to participate until a second user 316 can be joined, the game server may halt the game playback until it confirms that a second user is not joining (e.g., based on a threshold time, lack of designated second user, other users preventing second user from joining, or other such notification), continue playback while temporarily halting or removing the first user's character within a game environment, taking control of the first user's character and/or continuing to implement control in place of the first user 312, and/or other such actions.

Figure 11:
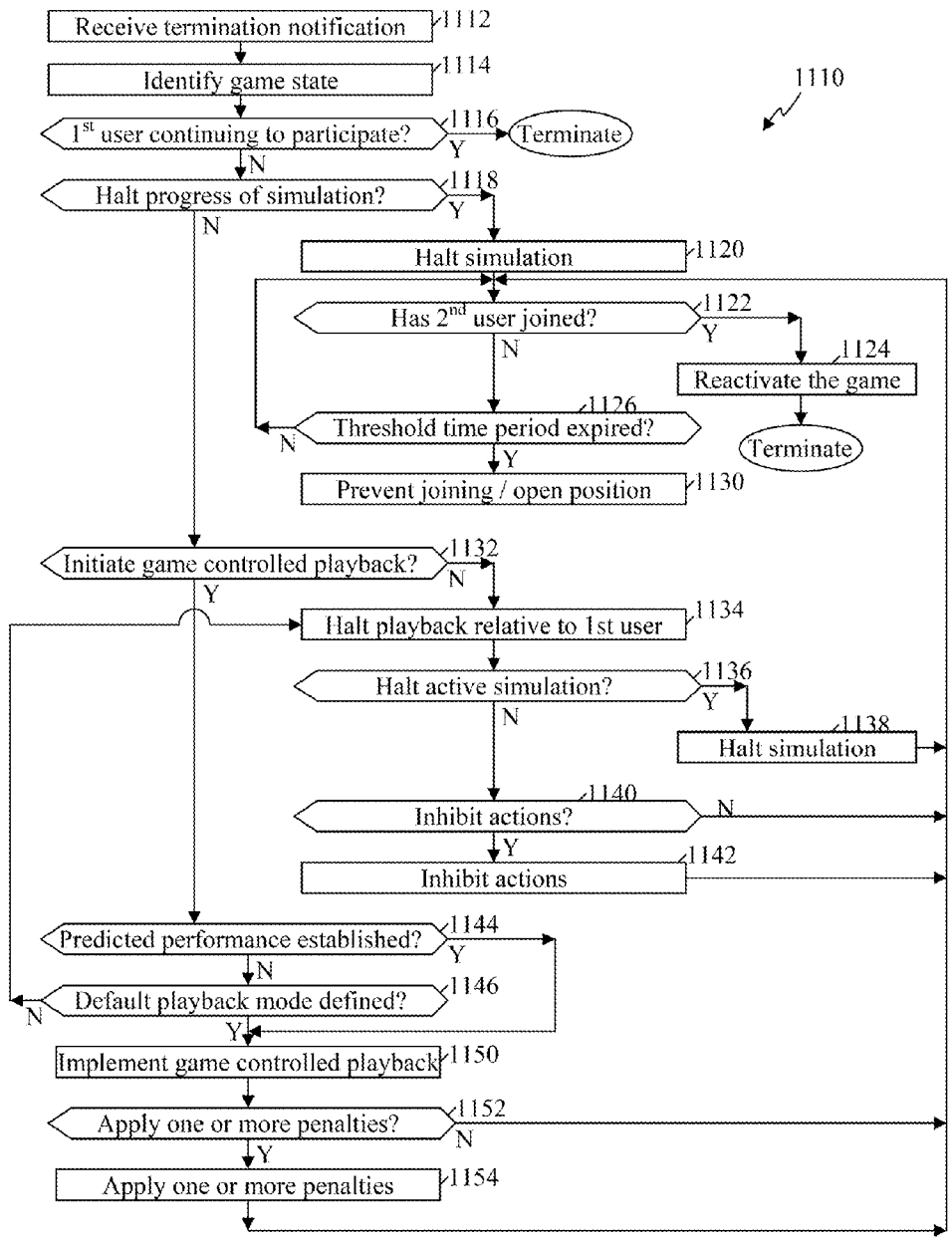
FIG. 11 shows a simplified flow diagram of an example process according to some embodiments in controlling a game or other simulation in response to detecting a notification of termination.

FIG. 11 shows a simplified flow diagram of an example process 1110 according to some embodiments in controlling a game or other simulation in response to detecting a notification of termination. In step 1112, a notification of termination is detected or a lost connection with the first user is detected, and the first user 312 associated with the termination or lost connection is identified. In step 1114, a game state associated with the first user and the first user's interaction with the game simulation, such as but not limited to the user's position within the game and parameters, attributes and the like associated with the user (e.g., identify the character within a game environment controlled by the first user 312;

identify the character's attributes, capabilities, powers, equipment, resources, and the like; identify a score associated with the first user; identify a level of playback within the game environment; and/or other such parameters). In step 1116 it is determined whether the first user is continuing to participate in the game. In those instances where the user continues participate in the game while awaiting a second user to join, the process 1110 terminates as the first user's participation avoids or reduces adverse affects to other users 322.

In step 1118, it is determined whether to halt progress of the game. In some instances, the playback of the game for all players may be halted in response to a termination by a first user 312 and/or an unexpected loss of the first user. The determination of whether to halt the game can depend on one or more factors, such as but not limited to a state of playback, how long a game has been active, whether there are any other users participating and/or how many other users are participating, the first user's current position and/or status within the game, whether the temporary lack of the first user's participation will adversely affect other users or will have a predicted limited adverse affect, whether other actions can be take to allow the game to continue and/or other such factors, whether one or more other users authorize the halt of the game, whether one or more other users instruct that a second user not be allowed to join in the reserved position, whether one or more other users authorize the system to provide playback for the first user 312, and/or other such factors. In those instances where the game is not to be halted the process advances to step 1132 to determine whether to initiate game server controlled playback.

When it is determined in step 1116 that the game should be halted the process 1110 continues to step 1120 and the game is halted. In step 1122 it is determined whether a second user 316 has joined that game in place of the first user 312. When the second user has joined step 1124 is entered where the game is reactivated. In those instances where the second user 316 has not joined step 1126 is entered to determine whether a join threshold time period has expired. When the threshold period has not expired the process 1110 returns to step 1122 to determine whether the second user has joined. Alternatively, when the threshold time period has expired step 1130 is entered where the reserved position within the game is terminated and the game is reactivated for the remaining users. In some instances the first user 312 may be notified of the termination of the reserved first position and/or the other users participating in the game may be notified (e.g., through a notification on the game, through secondary modes of communication or other such notification).

Some embodiments include step 1132 where it is determined whether to initiate game server controlled playback relative to the first user. In some embodiments, the game server can take control of playback for the first user 312, such as taking control of a character that was being controlled by the first user so that the game playback continues while trying to reduce or minimize the adverse affects to other users 322 participating in the game. One or more factors can be taken into account in determining whether to allow the game server or another automated device to take control of playback relative to the first user. Some of these factors can include but are not limited to whether a default playback capability is available for a given game simulation, state of game playback and/or the game server, whether there is sufficient data available to anticipate the first user's actions during game server controlled playback, whether there is sufficient data available to anticipate the identified second user's actions during game server controlled playback, affects on other users that might result from the first user's lack of participation, and other such factors and/or combinations of such factors.

When game server controlled playback is not to be implemented, the process 1110 continues to step 1134 where playback relative to the first position and the first user 312 is halted and/or frozen. In step 1136 it is determined whether the active game should be halted. Again, in instances where the lack of the first user's participation is anticipated to result in adverse effects to other users 322 that exceed a threshold the game server 320 may halt the playback of the game until the second user 316 joins or a threshold time period is exceeded. This halting may additionally or alternatively be based on a response from one or more other users 322 participating in the active game after having been notified that the first user has terminated participation or has otherwise been lost. Similarly, the halting of the game may be aborted in some instances where one or more other users 322 participating in the active game block or deny reserving of the first position and/or deny the second user's ability to join the active game in the first position. In those instances where the active game is to be halted the process halts the game in step 1138 and returns to step 1122 to await the second user 316 joining the game or the determination that the second user is not joining. It is noted that the threshold time period relative to step 1126 may be different when the game is halted than in other instances (e.g., because other users are waiting the threshold time may be reduced; because the game is halted adverse consequences within the game are avoided and thus the wait threshold can be extended; or other such scenarios).

When the game playback is not to be halted step 1140 is entered to determine whether to inhibit actions relative to the first user's participation. For example, in a game simulation where the first user 312 was associated with and/or controlling a character within the game environment that character may be hidden. In other instances, the character controlled by the first user 312 may be faded out or presented as a "ghost" character indicating to other users 322 participating in the simulation that the first user and/or control associated with the first use is temporarily inactive. Additionally or alternatively, a bubble and/or text can be displayed relative to the first user's game simulation representation (e.g., a character controlled by the first user) notifying others participating in the game of the temporary inactivity, or otherwise inhibit the character's abilities within the game environment from advantageously and/or adversely affecting playback. In those instances where actions are to be inhibited relative to the first user's participation the process 1110 advances to step 1142 where actions are inhibited, such as the character within the game environment associated with the first user 312 is hidden and/or presented as a ghost or shadow image.

When it is determined in step 1140 that actions are not to be inhibited and/or following step 1142 the process 1110 then returns to step 1122 to determine whether the second user has joined in the reserved position. Again, the threshold time limit considered in step 1126 may be different than in other situations once actions relative to the first position have been inhibited.

When it is determined in step 1132 that game server 320 controlled playback is to be initiated the process 1110 advances to allow the game server to provide at least some control relative to the first position and/or the first user's representation within the simulation, such as but not limited to allowing artificial intelligence to control the first user's game play based on history, previously defined settings, some default behavior or some other implementation. For example, the game server 320 may force the character previously controlled by the first user 312 to hide (e.g., run and hide behind a tree, structure or the like); replay the character's prior actions in one or more loops, which may depend on the situation and/or scenario within the game environment; make probabilistic choices based on the first user's previous actions or the second user's previous actions; control the character with aggressive, conservative, or other certain pre-defined settings (e.g., based on the first user's current level within the game environment, a first user's current score relative to other user's scores, and/or other such factors); perform game defaults, such as requiring continued ante's to stay at a simulated poker table with auto-folding at each hand until the second user joins and/or the threshold time period expires; or perform other relevant actions.

As such, in some embodiments, the process 1110 continues to step 1144 to determine whether predicted user performance has been established. As described above, in some instances and/or with some simulations the first user's actions may have be tracked, and/or the game sever 320 may have record of the second user's prior interaction with the game server. Based on the tracked actions that game simulation and/or server can more accurately predict how the first user or second user would act and/or react to given situations, conditions and/or scenarios. In some situations, a threshold amount of data and/or duration of playback time have to be acquired and/or tracked before the game simulation and/or game server can provide anticipated actions that relatively closely approximate a first or second user's actions. When it is determined in step 1144 that sufficient data has been obtained to continue playback of the game while the game server 320 controls playback relative to the first or second user, the process advances to step 1150 to continue playback while the game server applies predicted actions based on the first or second user's past performance and/or actions, which can include performance and actions in previous games. This game server interaction allows the game simulation to continue while providing the ability to maintain the reserved position and still allowing other users 322 to continue to participate with limited or no adverse (or in some instances no beneficial) effects resulting from the temporary absence of a user.

Alternatively, when it is determined in step 1144 that predicted user performance has not been established, the process continues to step 1146 to determine whether default playback mode is defined. In some implementations, the game server 320 and/or simulation may provide a default playback that allows the game simulation and/or playback server to control interactions within the game relative to the first user's position (e.g., by controlling a character within the game environment) based on predefined and default actions corresponding to one or more conditions and/or parameters. When a default playback mode is not defined the process 1110 advances to step 1134 where playback relative to the first user 312 is halted.

When it is determined in steps 1144 and/or 1146 that playback can continue, the process 1110 continues to step 1150 where playback is continued while the game server and/or game simulation controls playback relative to the first position. Some embodiments further include step 1152 to determine whether one or more penalties are to be assessed. As described above, in some instances one or more penalties may be applied in maintaining a first position. In step 1154 one or more penalties are applied when it is determined in step 1152 that penalties are to be applied. The process then returns to step 1122 to determine whether the second user 316 has joined the active game.

As such, the game server and/or game simulation can be configured to provide the ability to retain the first position within a game in the event of first user terminates participation, a connection is lost or other adverse condition that prevents or limits a first user's ability to effectively participate in a simulation. In some instances, the game server 320 and/or simulation determines whether the first and/or second user can take advantage of this functionality and/or notifies the first or second user of the functionality. For example, in response to receiving a first user's request to join a game the game server can notify the first user of the functionality and/or that the first user can upgrade to take advantage of the functionality to reserve her/his position for a second, replacement user should the first user have to terminate prior to the end of the game and/or should an error occur limiting or preventing the first user from continuing to participate in the simulation.

It is noted that the reserving the first position and/or providing the game state transfer to the second user can be implemented in cooperation with reserving the first position for the first user to rejoin the game, such as in the event of an unintended termination. For example, after determining the first user does not intent to rejoin the game the reserved position can be made available to the second user. Providing the first user with the ability to rejoin the game is described in detail in related U.S. Provisional Application No. 61/477, 104, filed Apr. 19, 2011, by Brian D. Buhr, and entitled METHOD AND APPARATUS FOR USE IN PRESERVING A GAME STATE, which is incorporated herein by reference in its entirety; and co-pending U.S. patent application Ser. No. 13/188,631, filed Jul. 22, 2011, by Brian D. Buhr, and entitled METHOD AND APPARATUS FOR USE IN PRESERVING A GAME STATE, which is incorporated herein by reference in its entirety.

Figure 12:
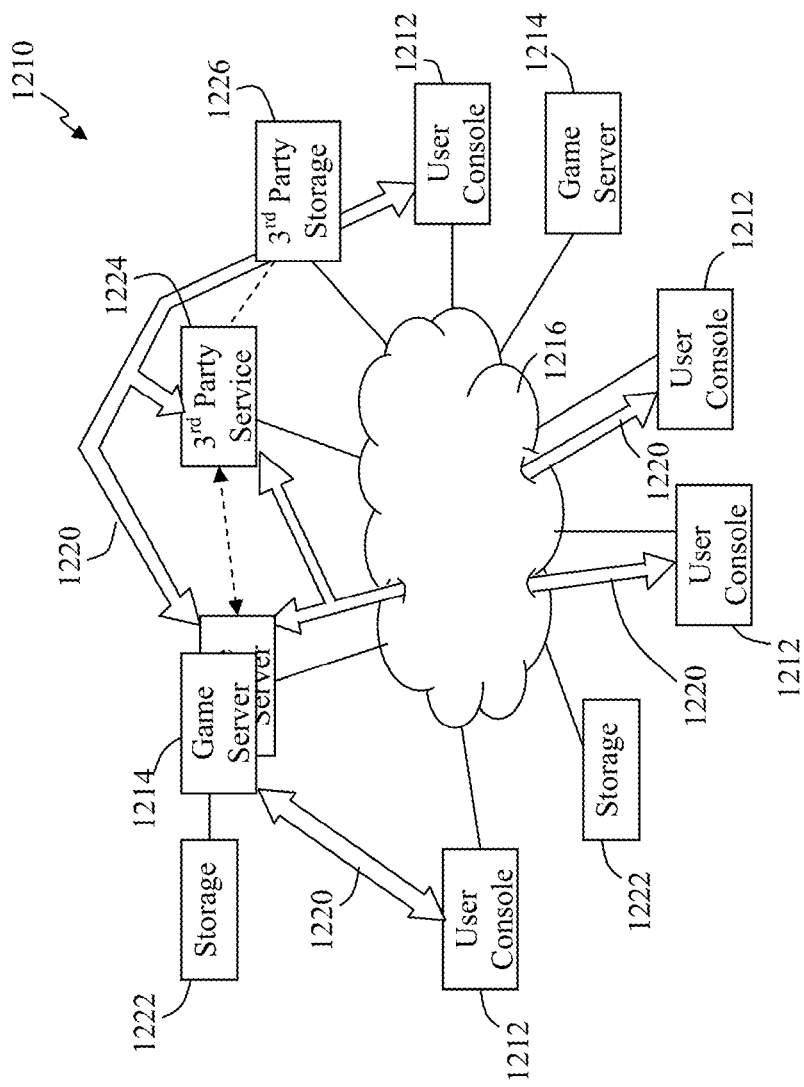
FIG. 12 depicts a simplified block diagram of a system according to some embodiments that allows users to participate in an interactive simulation and further provides the functionality to reserve a first user's position within a game.

FIG. 12 depicts a simplified block diagram of a system 1210 according to some embodiments that allows users to participate in an interactive simulation and further provides the functionality to reserve a first user's position within a game or other simulation for a second user. The system 1210 includes one or more user consoles, gaming devices and/or other devices 1212 configured to coupled with and interact with one or more simulation or game servers 1214 over one or more distributed networks 1216, and one or more secondary modes of communication 1220. In some embodiments, one or more of the secondary modes of communication 1220 may utilize the distributed network 1216 as part or all of the communication paths and/or links to achieve the communication. Some embodiments further include data storage 1222, one or more third party services 1224 and/or third party data storage devices 1226.

Using the gaming consoles or devices 1212 users can connect with a game server 1214 over the distributed network 1216 to access and participate in a game or other simulation. Further, the secondary modes of communication 1220 allow the game server 1214 and/or a third party service 1224 to communicate with the users over one or more of the secondary modes of communication 1220. In some instances the users have a secondary communication device (not shown), such as a cellular phone, a computer, or other such device, that can be used to communicate with the game server 1214 and/or third party service 1224 via the secondary mode of communication 1220.

As described above, in some embodiments, the game server 1214 communicates with a third party service 1224 to obtain secondary mode of communication information for a user and/or to request that the third party service implement communication with a user via the secondary mode of communication. This connection with the third party service may be over the distributed network 1216, a direct connection or some other mode and/or path of communication. Again, the third party service 1224 can be substantially any third party service, such as but not limited to a dedicated service for maintaining user information, a third party web site (e.g., a social networking web site), or substantially any other such service and/or entity.

The user device 1212 can include substantially any relevant device to participate in an interactive game or simulation hosted by the game server 1214. For example, the user device can be a game console (e.g., a Sony PlayStation®), a portable gaming device (e.g., a Sony PlayStation Portable (PSP)), a cellular phone, a smart phone, a computer, or other relevant user device that allows a user to connect with the game server 1214 and participate in an interactive simulation.

Figure 13:
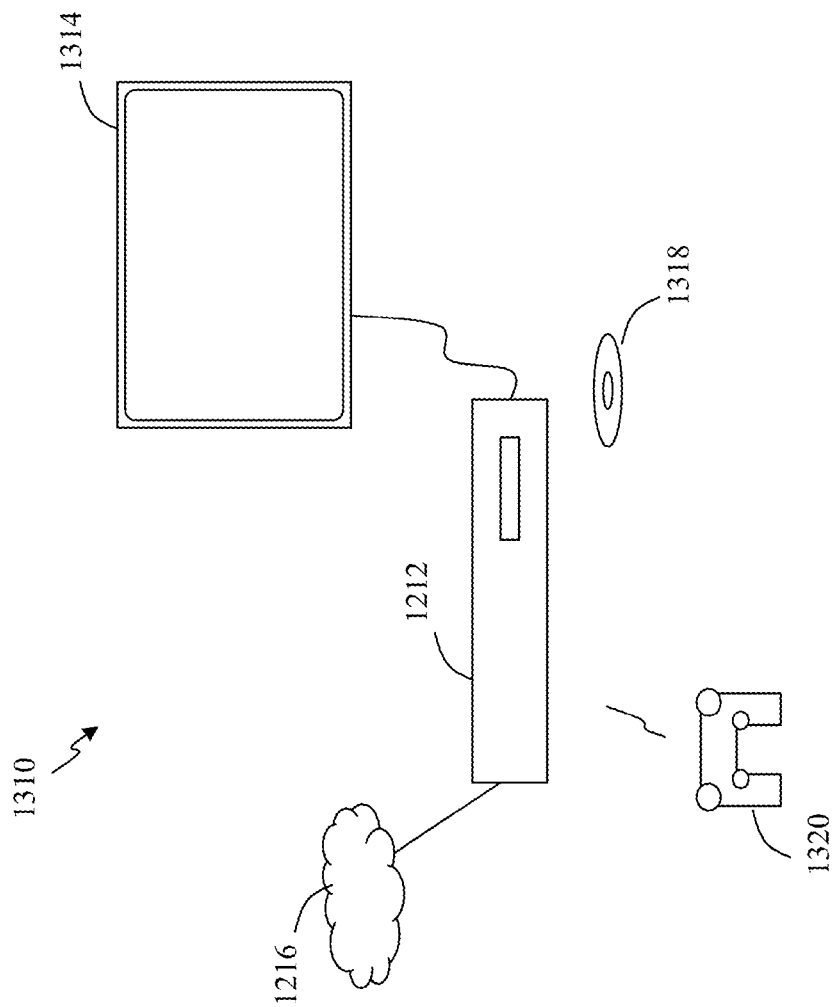
FIG. 13 depicts a simplified block diagram illustrating a user device or system that operates in accordance with some embodiment to allow a user to access and participate in an interactive simulation.

FIG. 13 depicts a simplified block diagram illustrating a user device or system 1310 that operates in accordance with some embodiment to allow a user to access and participate in an interactive simulation, such as an online interactive game. As illustrated in FIG. 13, the user device or system 1310 can include a computer, game console, entertainment system/console or the like 1212, which may include or be coupled to a display device 1314, such as a television, monitor, or other type of visual display. The user device 1212, depicted as a game console, further couples with the distributed network 1216 to allow the user to access and participate with an interactive simulation. In some embodiments, a game, software, executables, or other simulations may be stored on a storage media 1318 such as a Blu-ray disc, DVD, a CD, flash memory, USB memory or other type of memory media that can be used as a stand alone or in cooperation with a simulation accessed at a game server 1214. The storage media 1318 can be coupled with and/or inserted into the console 1212 where it is read. The console can access the remote game server 1214 and/or program instructions locally stored and/or stored on the storage media 1318 to present an interface to the user, such as a game or simulation interface.

Typically, a user or player utilizes a user interface or input device that is integral with the console 1212 and/or external to the console, such as buttons, touch pad, track ball, a game controller 1320, a keyboard, mouse, or other such user input device or controller that is integral with or wired and/or wirelessly coupled with the console 1212. For example, a user interfaces with and manipulates an input device such as a game controller 1320 to control and interact with the video game or other simulation. The game controller 1320 may include conventional controls, for example, control input devices such as joysticks, buttons and the like. In addition, the game controller 1320 can include an internal sensor, for example an accelerometer, which produces signals in response to the position motion orientation or change in orientation of the game controller 1320. In some instances, the game controller 1320 can include light emitting diodes (LEDs) or other indicators and/or other photonically detectable ("PD") elements. The phrase game controller is used to describe any type of Human Input Device (HID) or other input device used to interact with a game. The phrase game console is used to describe any type of computer, computing device, portable device, or game system that can execute a game program and/or communicate with the game server 1214 and allow a user to interact with and participate in a simulation.

During operation of the console 1212 when user is playing a game, the user can use the game controller 1320 to interact with the game. For example, the user may push buttons, or uses a joystick on the game controller 1320 to interact with the game. In some embodiments, the user can additionally or alternatively move the game controller 1320 in a direction such as up, down, to one side, to the other side, twisted, wedged, shaken, jerked, punched, etc. In addition to using the game controller 1320 to interact with the game, use of buttons, joysticks, and movements of the game controller 1320, and the like, may be detected and captured in the game console 1212, for example using imaging and/or acoustic data, for analysis of the user's interaction, controls and/or game performance.

In general, signals from the game controller 1320 and/or detected movements of the game controller are used to generate positions and orientation data that may be used to calculate many physical aspects of the user's interaction with a game. Certain movement patterns or gestures for the game controller 1320 may be predefined and used as input commands for the game or other simulation. For example, a plunging downward gesture of the game controller 1320 may be defined as one command, a twisting gesture of the game controller 1320 may be defined as another command, a shaking gesture of the game controller 1320 may be defined as still another command, and so on. In this way the manner in which the user physically moves the game controller 1320 can be used as an input for controlling the game which provides more pleasurable and stimulating experience for the user.

Again, FIG. 13 is one example of a user device and/or system 1310 that allows a user to participate in an interactive simulation. Other similar devices can alternatively or additionally be used. For example, the user device may be a portable device with similar functionality as the user system 1310, with a built in display and user interface, and in some instances may utilize portable memory. As another example, the game console 1212 may comprise a computer.

Figure 14:
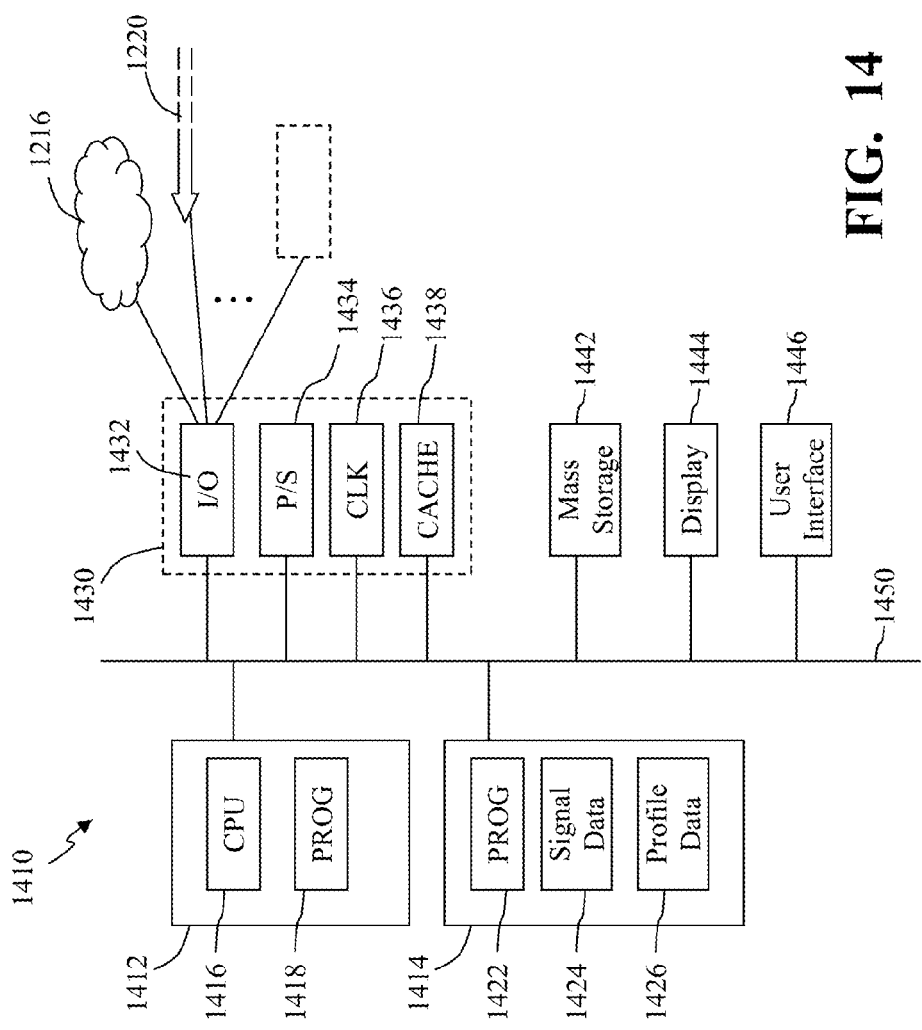
FIG. 14 is a block diagram of a system or apparatus that may be used to implement various embodiments described herein.

FIG. 14 is a block diagram of a system or apparatus 1410 that may be used to implement various embodiments described herein. For example, the system 1410 may be used to implement one or more game servers that host and/or provide users the ability to participate in a simulation using signals, data, information, instructions, commands, software, executables, and/or instructions from the user device, locally stored and/or accessed from remote storage.

The system 1410 comprises an example of a processor based system or apparatus, and may include one or more processor modules 1412 and memory modules 1414. In some embodiments, memory module 1414 may be RAM, DRAM, ROM, and/or substantially any other relevant digital storage memory and/or combinations of such storage. In addition, the system 1410 may have multiple processor modules 1412, for example when parallel processing is to be implemented. The processor module 1412 can include a central processing unit (CPU) 1416. In addition, the processor module 1412 can include local storage or a cache 1418 to store executable programs, information and/or data.

The memory module 1414 can include software, executables, programs and the like 1422, such as game program storage. In addition, the memory module 1414 can include signal data storage 1424, for example, signal data acquired from one or more user devices. The memory module 1414 can also include user and/or playback device data 1426 such as user profile data as well as game statistics that may be provided.

The system 1410 further includes support function module 1430 such as input/output elements 1432, power supplies 1434, a clock 1436, in cache memory 1438, and/or other such support functions. The input/output elements 1432 allow the game server to couple with and communicate over the distributed networks 1216, the secondary modes of communication 1220, and/or couple with other devices. The system 1410 may also optionally include mass storage module 1442 such as a disc drive, flash memory, Blu-ray disc drive, CD ROM drive, DVD drive, USB drive, tape drive or the like to store programs and/or data. The mass storage module 1442, which may include removable storage media, may be used for storing code that implements some or all of the methods and techniques described herein. It should be understood that any of such storage devices mentioned herein may serve as a tangible processor and/or computer readable storage medium for storing or embodying a processor and/or computer program for causing a console, apparatus, system, computer, or other processor based system to execute or perform the steps of any of the methods, code, and/or techniques described herein. Furthermore, any of the storage devices, such as the RAM or mass storage module, may be used for storing any needed database(s).

The system 1410 may also optionally include one or more display modules and/or drives 1444 as well as one or more user interface modules 1446 to facilitate interaction between the system 1410 and one or more system controllers. Display module 1444 output signals to a display device and/or may be in the form of a cathode ray tube, a flat panel screen, touch screen display, or any other display module. The user interface module 1418 may include and/or be communication ports to a keyboard, mouse, joystick, write pen, game controller and/or other device such as a microphone, optical sensor, video camera or other user input device. The processor, memory, and other components within the system 1410 may exchange signals such as code instructions and data with each other via one or more system communication networks and/or buses 1450.

Figure 15:
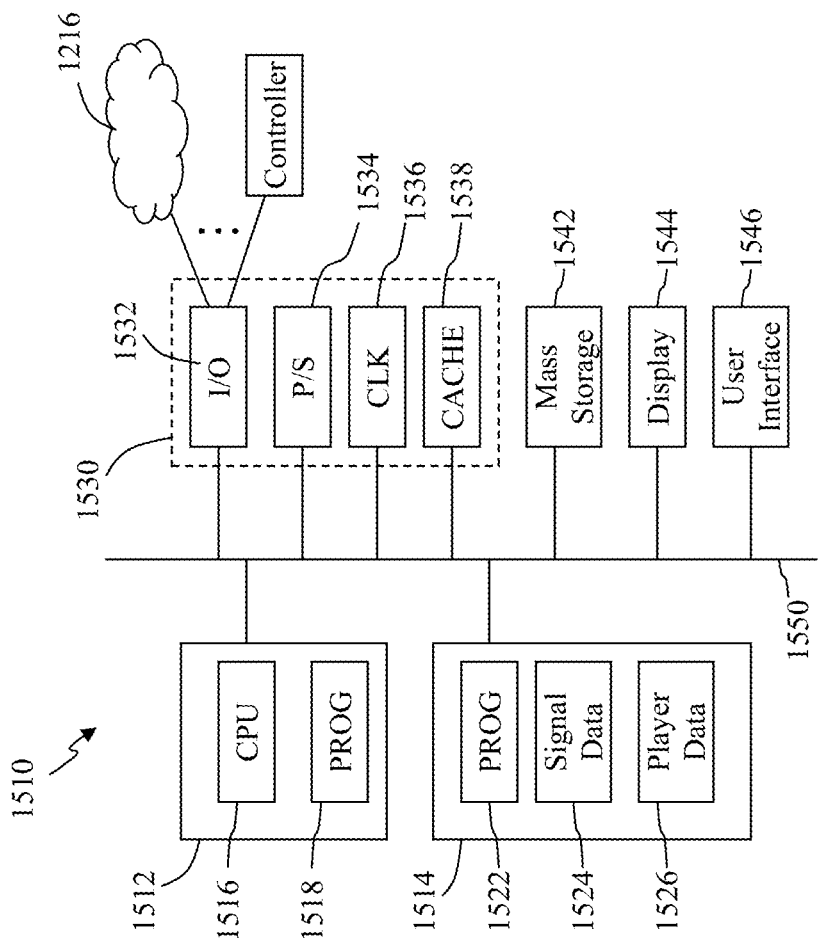
FIG. 15 is a block diagram of a user device, system or apparatus that may be used to implement various embodiments described herein.

FIG. 15 is a block diagram of a user device, system or apparatus 1510 that may be used to implement various embodiments described herein. For example, the system 1510 may be used to generate and render a simulation using signals, data, information, instructions, commands, software, executables, and/or instructions from the game server, locally stored and/or accessed from the medium 1318. By way of example, the system/apparatus 1510 may comprise a game console, gaming system/apparatus, entertainment apparatus/system, computer, a portable gaming apparatus, a portable cellular phone, a portable smart phone, and/or other such relevant devices that allow a user to connect with a game server and participate in an interactive simulation.

The system 1510 comprises an example of a processor based system or apparatus. As shown in FIG. 15, the system 1510 may include a processor module 1512 and a memory module 1514. In some embodiments, memory module 1514 may be RAM, DRAM, ROM, and/or substantially any other relevant digital storage memory and/or combinations of such storage. In addition, the system 1510 may have multiple processor modules 1512, for example when parallel processing is to be implemented. The processor module 1512 can include a central processing unit (CPU) 1516. In addition, the processor module 1512 can include local storage or a cache 1518 to store executable programs, information and/or data.

The memory module 1514 can include software, executables, programs and the like 1522, such as game program storage. In addition, the memory module 1514 can include signal data storage 1524, for example, signal data acquired from game controller operated by a user. The memory module 1514 can also include player data 1526 such as player profile data as well as game statistics that may be provided.

The system 1510 may also include well-known support function module 1530 such as input/output elements 1532, power supplies 1534, a clock 1536, in cache memory 1538, and/or other such support functions. The system 1510 may also optionally include mass storage module 1542 such as a disc drive, Blu-ray disc drive, CD ROM drive, DVD drive, USB drive, tape drive or the like to store programs and/or data. The mass storage module 1542, which may include removable storage media, may be used for storing code that implements some or all of the methods and techniques described herein. It should be understood that any of such storage devices mentioned herein may serve as a tangible processor and/or computer readable storage medium for storing or embodying a processor and/or computer program for causing a console, apparatus, system, computer, or other processor based system to execute or perform the steps of any of the methods, code, and/or techniques described herein. Furthermore, any of the storage devices, such as the RAM or mass storage module, may be used for storing any needed database(s).

The system 1510 may also optionally include a display module and/or drive 1544 as well as a user interface module 1546 to facilitate interaction between the system 1510 and the user. Display module 1544 output signals to a display device and/or may be in the form of a cathode ray tube, a flat panel screen, touch screen display, or any other display module. The user interface module 1518 may include and/or be communication ports to a keyboard, buttons, mouse, joystick, write pen, game controller and/or other device such as a microphone, video camera or other user input device. The processor, memory, and other components within the system 1510 may exchange signals such as code instructions and data with each other via one or more system communication networks and/or buses 1550.

Various embodiments described may be implemented primarily in hardware, or software, or a combination of hardware and software. For example, a hardware implementation may include using, for example, components such as application specific integrated circuits ("ASICs"), or field programmable gate arrays ("FPGAs"). Implementation of a hardware state machine capable of performing the functions described herein will also be apparent to those skilled in the relevant art.

The term "module" and/or "device" as used herein means, but is not limited to a software or hardware component, such as an FPGA or an ASIC, which performs certain tasks. A module or device may advantageously be configured to reside on an addressable storage medium and configured to execute on one or more network enabled devices or processors. Thus, a module or device may include, by way of example, components, processes, functions, attributes, procedures, subroutines, segments of program code, drivers, firmware, microcode, circuitry, data, databases, data structures, tables, arrays, variables, and the like. The functionality provided for in the components, modules and/or devices may be combined into fewer components, modules and/or devices, or further separated into additional components, modules and/or devices. Additionally, the components, modules and/or devices may advantageously be implemented to execute on one or more network enabled devices or computers.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a Blu-ray disc, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

By way of example, in some embodiments a storage medium may store a computer program executable by a processor based system/apparatus. The computer program may be configured to cause the processor based system to execute steps comprising any of the processes, methods and/or techniques described herein. For example, in some embodiments, one or more of the embodiments, methods, approaches, processes and/or techniques described above may be implemented in a computer program executable by a processor based system/apparatus. By way of example, such processor based system/apparatus may comprise the processor based system/apparatus 1410, a similar apparatus, or a computer, entertainment system, game console, etc. Such computer program may be used for executing various steps and/or features of the above-described processes, methods and/or techniques. That is, one or more computer programs may be adapted to cause or configure a processor based system to execute and achieve the functions described above. For example, such computer program may be used for implementing any embodiment of the above-described processes, methods and techniques, such as for example, retaining a user's position within an active simulation in the event a user losses connection or otherwise is unable to continue participating in the simulation. As another example, such computer program may be used for implementing any type of tool or similar utility that uses any one or more of the above described embodiments, processes, methods, approaches, and/or techniques. In some embodiments, the computer program may comprise a video game, computer game, role-playing game (RPG), or other computer simulation. In some embodiments, program code modules, loops, subroutines, etc., within the computer program may be used for executing various steps and/or features of the above-described processes, methods and/or techniques. In some embodiments, the computer program may be stored or embodied on a processor and/or computer readable storage or recording medium or media, such as any of the computer readable storage or recording medium or media described herein.

Therefore, some embodiments provide a computer program product comprising a computer readable storage medium for embodying a computer program for input to a processor and/or computer and a computer program embodied in the medium for causing the processor and/or computer to perform or execute steps comprising any one or more of the steps involved in any one or more of the embodiments, processes, methods, approaches, and/or techniques described herein. For example, some embodiments provide a computer readable storage medium storing a computer program adapted to cause a processor based system to execute steps comprising: detecting a loss of connection with a first user remotely accessing and actively participating in an interactive electronic game in progress; determining, in response to detecting the loss of the connection with the first user, a gaming state associated with the first user; determining whether a confirmation is received from the first user confirming that the first user intends to rejoin the interactive game; and retaining, in response to determining that the confirmation is received, the game state.

As another example, some embodiments provide a computer readable storage medium storing a computer program adapted to cause a processor based system to execute steps comprising: providing a gaming environment configured to allow one or more users to remotely access and participate in an interactive game; identifying a first user actively participating in the interactive game; detecting a loss of connection with the first user while the interactive game is still in progress; determining, in response to detecting the loss of the connection with the first user, a gaming state associated with the first user; receiving a confirmation from the first user that the first user intends to rejoin the same interactive game; retaining, in response to receiving the confirmation from the first user, the game state to be re-associated with the first user in response to the first user rejoining the interactive game; reestablishing, in response to initiating a reactivation of the first user as a game character within the interactive game, a state of playback corresponding to the first user within the interactive game as defined by the retained game state.

Some embodiments further assess one or more penalties to the first character within the game environment. Additionally, some embodiments in retaining the game state: maintain one or more scores corresponding to the first character at a time during the active game when the loss of the connection is detected; and adjust one or more of the one or more scores by applying the one or more penalties to corresponding ones of the one or more scores establishing one or more adjusted score; wherein the reestablishing the state of playback corresponding to the first user can comprise reactivating the first user to control playback relative to the first character and associating the one or more adjusted scores with the first character. Further, some embodiments detect a loss of connection with a second user remotely accessing and actively participating in the interactive game in progress; retain a game state associated with the second user configured to be re-associated with the second user should the second user rejoin the interactive game; receive input from one or more users other than the second user participating in the interactive game; determine, from the input from the one or more users other than the second user, whether the one or more users other than the second user authorize the second user to rejoin the interactive game; and prevent the second user from rejoining the interactive game in response to determining that the one or more other users did not authorize the second user to rejoin the game.

As another example, some embodiments provide a computer readable storage medium storing a computer program adapted to cause a processor based system to execute steps comprising: detecting a loss of a connection on a first mode of communication and over a distributed network with a first user participating in an interactive game; identifying a secondary mode of communication associated with the first user; requesting, using the secondary mode of communication and in response to detecting the loss of the connection, confirmation from the first user that the first user intends to rejoin the interactive game; determining, in response to issuing the request for the confirmation that the first user intends to rejoin the interactive game, whether the first user intends to rejoin the interactive game; and retaining, in response to determining that the first user intends to rejoin the interactive game, a game state associated with the first user of the interactive game at a time the loss of the connection was detected. In some implementations, the identifying the secondary mode of communication associated with the first user comprises: requesting, over the network and from a third party service, the secondary mode of communication, and corresponding contact information associated with the first user for the secondary mode of communication; and receiving, from the third party service and over the network, an identification of the secondary mode of communication and the corresponding contact information.

As mentioned above, in some embodiments the game controller or other input device may comprise a motion sensing controller or other motion sensing input device. In some embodiments, such motion sensing controller may comprise a hand-held controller that has the ability to have its three-dimensional movements tracked. Such tracking may be performed in many different ways. For example, such tracking may be performed through inertial, image, video, acoustical, infrared and/or other such analysis. Such motion sensing capabilities may also be implemented with an accelerometer or the like. As another example, such motion sensing capabilities may be implemented in some embodiments with a so-called "six-axis controller" or the like.

While the invention herein disclosed has been described by means of specific embodiments, examples and applications thereof, numerous modifications and variations could be made thereto by those skilled in the art without departing from the scope of the invention set forth in the claims.

What is claimed is:

1. A method of providing interactive electronic gaming, the method comprising:

detecting, at a game server and during an active interactive electronic game with which a plurality of remote users are participating over a distributed network, a termination of a participation of a first user in the active interactive game, wherein the first user is one of the plurality of remote users, and wherein the game server hosts the interactive game allowing the plurality of remote users through corresponding user devices to access over the distributed network the game server and participate in the interactive game, detecting a loss of an effective communication with a first user device of the user devices utilized by the first user in participating in the interactive game, wherein the effective communication provides sufficient enough communication between the first user device and the game server to allow the first user to continue to participate in the interactive game, and terminating the participation by the first user in the interactive game;

identifying a first position within the interactive game corresponding with the first user of the plurality of remote users, wherein the first position allows one of the plurality of remote users to participate in the interactive game and comprises a relative association and cooperative playback, within the interactive game, with one or more of the plurality of remote users participating in the interactive game;

determining, at the game server and during the active interactive game, whether to provide a game state transfer of the first position within the interactive game in response to the terminating the participation of the first user in the interactive game;

identifying a remote second user to which the first position is to be transferred, wherein the second user is remote from the game server and is not an active participant in the interactive game; and reserving the first position for the identified second user such that the first position is reserved for the second user to subsequently join, through a second user device that is separate from the game server and is configured to access the game server, the interactive game into the first position allowing the second user to participate in the game in place of the first user and take over the first user's participation within the game;

wherein the reserving the first position comprises reserving a first game character within the interactive game, wherein the first game character is associated with the first position and controlled by the first user, and wherein the establishing the game state of the second user comprises providing the second user with control over the first game character within the interactive game.

2. The method of claim 1, further comprising:

receiving a request from the second user to join the interactive game; and joining the second user to the interactive game in the first position such that the second user is capable of actively participating in the interactive game relative to the first position and is capable of providing at least some control over the interactive game corresponding to the first position.

3. The method of claim 2, wherein the reserving the first position comprises:

identifying a game state corresponding to the first user; and maintaining the game state; and wherein the joining the second user comprises establishing a second game state of the second user comprising applying at least part of the maintained game state to the second game state to be used in playback by the second user.

4. The method of claim 3, wherein the reserving the first position comprises reserving a position on a team, and wherein the establishing the game state of the second user comprises providing the second user with the control over the first game character within the interactive game in the position on the team.

5. The method of claim 3, further comprising:

determining whether a confirmation is received from the second user confirming that the second user intends to join the interactive game; and maintaining the first position for the second user in response to receiving the confirmation.

6. The method of claim 5, further comprising:
communicating a confirmation request, over a secondary communication mode and in response to the detecting the termination of a first user's participation, to the second user requesting confirmation that the second user intends to join the interactive game in place of the first user;
wherein the second communication mode is different than a first communication mode that is configured to allow the second user to interactively participate in the interactive game over the distributed network; and
wherein the request from the second user to join the interactive game is received in response to the confirmation request communicated to the second user.

7. The method of claim 5, wherein the detecting the termination of the first user's participation in the active interactive game comprises detecting a loss of the connection over a first communication mode with the first user, where the first communication mode is configured to allow the first user to interactively participate in the interactive game over the distributed network; and
receiving the confirmation from the second user over a second communication mode different than the first communication mode.

8. The method of claim 2, further comprising:
determining whether a confirmation is received from the second user confirming that the second user intends to join the interactive game; and
maintaining the first position for the second user in response to receiving the confirmation.

9. The method of claim 8, further comprising:
notifying, in response to determining to provide the game state transfer, the second user that the first position is available;
wherein the determining whether the confirmation is received comprises determining whether the confirmation is received in response to the notification to the second user that the first position is available; and
maintaining the first position for the second user in response to receiving the confirmation.

10. A computer program product comprising a non-transitory computer-readable storage medium for embodying a computer program for input to a processor based system and a computer program embodied in the medium for causing the processor based system to perform steps comprising:
detecting, during an active interactive electronic game with which a plurality of remote users are participating over a distributed network, a termination of a participation of a first user in the active interactive game, wherein the first user is one of the plurality of remote users, and wherein the plurality of remote users through corresponding user devices access and participate in the interactive game over the distributed network, detecting a loss of an effective communication with a first user device of the user devices being utilized by the first user in participating in the interactive game, wherein the effective communication provides sufficient enough communication between the first user device and a game server to allow the first user to continue to participate in the interactive game, and terminating the participation by the first user in the interactive game;
identifying a first position within the interactive game corresponding with the first user of the plurality of remote users, wherein the first position allows one of the plurality of remote users to participate in the interactive game and comprises a relative association and cooperative playback, within the interactive game, with one or more of the plurality of remote users participating in the interactive game;
determining, during the active interactive game, whether to provide a game state transfer of the first position within the interactive game in response to the terminating the participation of the first user in the interactive game;
identifying a remote second user to which the first position is to be transferred, wherein the second user is remote from the game server and is not an active participant in the interactive game; and
reserving the first position for the identified second user such that the first position is reserved for the second user to subsequently join, through a second user device that is separate from the game server and is configured to access the game server, the interactive game into the first position allowing the second user to participate in the game in place of the first user and take over the first user's participation within the game;
wherein the reserving the first position comprises reserving a first game character within the interactive game, wherein the first game character is associated with the first position and controlled by the first user, and wherein the establishing the game state of the second user comprises providing the second user with control over the first game character within the interactive game.

11. A computer program product in accordance with claim 10, wherein the computer program is further configured for causing the processor based system to perform the steps comprising:
receiving a request from the second user to join the interactive game; and
joining the second user to the interactive game in the first position such that the second user is capable of actively participating in the interactive game relative to the first position and is capable of providing at least some control over the interactive game corresponding to the first position.

12. A computer program product in accordance with claim 11, wherein the step of reserving the first position comprises:
identifying a game state corresponding to the first user; and
maintaining the game state; and
wherein the step of joining the second user comprises establishing a second game state of the second user comprising applying at least part of the maintained game state to the second game state to be used in playback by the second user.

13. A computer program product in accordance with claim 12, wherein the computer program is further configured for causing the processor based system to perform the steps comprising:
determining whether a confirmation is received from the second user confirming that the second user intends to join the interactive game; and
maintaining the first position for the second user in response to receiving the confirmation.

14. A system comprising:
a processor; and
memory accessible by the processor, the memory storing programming that when implemented by the processor causes the processor to perform the steps of:
detecting, during an active interactive electronic game with which a plurality of remote users are participating over a distributed network, a termination of a participation of a first user in the active interactive game, wherein the first user is one of the plurality of remote users, and wherein the plurality of remote users through corresponding user devices access and participate in the interactive game over the distributed network, detecting a loss of an effective communication with a first user device of the user devices being utilized by the first user in participating in the interactive game, wherein the effective communication provides sufficient enough communication between the first user device and the game server to allow the first user to continue to participate in the interactive game, and terminating the participation by the first user in the interactive game;

identifying a first position within the interactive game corresponding with the first user of the plurality of remote users, wherein the first position allows one of the plurality of remote users to participate in the interactive game and comprises a relative association and cooperative playback, within the interactive game, with one or more of the plurality of remote users participating in the interactive game;

determining, during the active interactive game, whether to provide a game state transfer of the first position within the interactive game in response to the terminating the participation of the first user in the interactive game;

identifying a remote second user to which the first position is to be transferred, wherein the second user is remote from the game server and is not an active participant in the interactive game; and reserving the first position for the identified second user such that the first position is reserved for the second user to subsequently join, through a second user device that is separate from the game server and is configured to access the game server, the interactive game into the first position allowing the second user to participate in the game in place of the first user and take over the first user's participation within the game;

wherein the reserving the first position comprises reserving a first game character within the interactive game, wherein the first game character is associated with the first position and controlled by the first user, and wherein the establishing the game state of the second user comprises providing the second user with control over the first game character within the interactive game.

15. The system of claim 14, wherein the programming when implemented by the processor causes the processor to further perform the steps of:
receiving a request from the second user to join the interactive game; and
joining the second user to the interactive game in the first position such that the second user is capable of actively participating in the interactive game relative to the first position and is capable of providing at least some control over the interactive game corresponding to the first position.

16. The system of claim 15, wherein the programming when implemented by the processor causes the processor to further perform the steps of:
identifying a game state corresponding to the first user; and
maintaining the game state; and
wherein the programming when implemented by the processor to implement the joining the second user comprises programming when implemented by the processor causing the processor to perform the further step of establishing a second game state of the second user comprising applying at least part of the maintained game state to the second game state to be used in playback by the second user.

17. The system of claim 16, wherein the programming when implemented by the processor causes the processor to further perform the steps of:
determining whether a confirmation is received from the second user confirming that the second user intends to join the interactive game; and
maintaining the first position for the second user in response to receiving the confirmation.

* * * * *